United States Patent
Han et al.

(10) Patent No.: US 8,804,478 B2
(45) Date of Patent: Aug. 12, 2014

(54) APPARATUS AND METHOD FOR TRANSMITTING DATA USING A PLURALITY OF CARRIERS

(75) Inventors: Seung Hee Han, Seoul (KR); Min Seok Noh, Seoul (KR); Yeong Hyeon Kwon, Gyeonggi-do (KR); Hyun Hwa Park, Gyeonggi-do (KR); Hyun Woo Lee, Gyeonggi-do (KR); Dong Cheol Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 252 days.

(21) Appl. No.: 12/093,134

(22) PCT Filed: Nov. 10, 2006

(86) PCT No.: PCT/KR2006/004705
§ 371 (c)(1),
(2), (4) Date: Oct. 24, 2008

(87) PCT Pub. No.: WO2007/055531
PCT Pub. Date: May 18, 2007

(65) Prior Publication Data
US 2009/0219802 A1 Sep. 3, 2009

Related U.S. Application Data

(60) Provisional application No. 60/862,202, filed on Oct. 19, 2006.

(30) Foreign Application Priority Data

Nov. 10, 2005 (KR) .................. 10-2005-0107273
Nov. 3, 2006 (KR) .................. 10-2006-0108161

(51) Int. Cl.
*H04J 11/00* (2006.01)
*H04W 56/00* (2009.01)

(52) U.S. Cl.
CPC ......... *H04J 11/0073* (2013.01); *H04J 11/0076* (2013.01); *H04W 56/0015* (2013.01)
USPC ............ 370/210; 370/208; 370/350; 370/503

(58) Field of Classification Search
None
See application file for complete search history.

(56) References Cited

U.S. PATENT DOCUMENTS 5,970,092 A * 10/1999 Currivan .................. 375/232
6,498,822 B1 * 12/2002 Tanaka .................. 375/354
(Continued)

FOREIGN PATENT DOCUMENTS

| CN | 1317903 | 10/2001 |
| CN | 1611026 | 4/2005 |

(Continued)

OTHER PUBLICATIONS

Chu, David C.—"Polyphase Codes with good periodic correlation properties." IEEE Transactions on Information Therory, vol. 18, Issue 4, pp. 531-532, Jul. 1972.*

(Continued)

*Primary Examiner* — Kimbrom T Hailu
*Assistant Examiner* — James P Duffy
(74) *Attorney, Agent, or Firm* — Lee, Hong, Degerman, Kang & Waimey

(57) ABSTRACT

The present invention relates to a data transceiving method in a communication system based on a plurality of carriers, and more particularly, to a method of designing a sequence in a communication system using orthogonal subcarriers. The present invention includes the steps of generating a time-domain sequence with a specific length in a time domain, generating a frequency-domain sequence by performing a DFT or FFT operation on the time-domain sequence according to a length of the generated sequence, including a DC subcarrier and a guard subcarrier in the frequency-domain sequence, and performing an IDFT or IFFT operation on the frequency-domain sequence including the DC subcarrier and the guard subcarrier.

6 Claims, 25 Drawing Sheets

(56) References Cited

U.S. PATENT DOCUMENTS

| | | | | |
|---|---|---|---|---|
| 2002/0106009 A1* | 8/2002 | Harrison | ............ | 375/219 |
| 2002/0118635 A1* | 8/2002 | Nee | ............ | 370/210 |
| 2002/0181509 A1* | 12/2002 | Mody et al. | ............ | 370/480 |
| 2003/0169683 A1* | 9/2003 | Mendlovic et al. | ............ | 370/208 |
| 2004/0066740 A1* | 4/2004 | Suh et al. | ............ | 370/208 |
| 2004/0085946 A1* | 5/2004 | Morita et al. | ............ | 370/342 |
| 2004/0170121 A1* | 9/2004 | Kim et al. | ............ | 370/208 |
| 2004/0190440 A1 | 9/2004 | Kim et al. | | |
| 2004/0202103 A1* | 10/2004 | Suh et al. | ............ | 370/208 |
| 2006/0050664 A1* | 3/2006 | Guey | ............ | 370/329 |
| 2006/0050799 A1* | 3/2006 | Hou et al. | ............ | 375/260 |
| 2006/0104335 A1* | 5/2006 | Trachewsky | ............ | 375/141 |
| 2007/0183386 A1* | 8/2007 | Muharemovic et al. | ............ | 370/344 |
| 2007/0270273 A1* | 11/2007 | Fukuta et al. | ............ | 475/206 |
| 2008/0019350 A1* | 1/2008 | Onggosanusi et al. | ............ | 370/350 |
| 2008/0049851 A1* | 2/2008 | Nangia et al. | ............ | 375/260 |

FOREIGN PATENT DOCUMENTS

| | | |
|---|---|---|
| JP | 2007-510390 | 4/2007 |
| JP | 2008-544650 | 12/2008 |
| JP | 2009-505565 | 2/2009 |
| KR | 10-2004-0036630 | 4/2004 |
| WO | 2004/079937 | 9/2004 |
| WO | 2006/015108 | 2/2006 |
| WO | 2006/096784 | 9/2006 |

OTHER PUBLICATIONS

David C. Chu—"Polyphase Codes with good periodic correlation properties." IEEE Transactions on Information Therory, vol. 18, Issue 4, pp. 531-532, Jul. 1972.

Heimiller, R.—"Phase shift pulse codes with good periodic correlation properties." Information Theory, IRE Transactions on Information Theory, vol. 7, Issue; 4 pp. 254-257, Oct. 1961.

ZTE, "TP for Downlink Synchronization Channel Schemes for E-UTRA," 3GPP TSG-RAN1 WG1 #42bis, R1-051072, Oct. 10, 2005.

OFDM (Orthogonal Division Frequency Multiplexing), "Theory & Implement of Orthogonal Division Frequency Multiplexing," Shandong Electronics, pp. 40-42, Apr. 2002.

Korean Intellectual Property Office Application Serial No. 10-2006-0108161, Notice of Allowance dated Aug. 13, 2013, 2 pages.

Liang, et al., "IEEE P802.22 Wireless RANs System description and operation principles for IEEE 802.22 WRANs", IEEE 802.22-05/0093r0, Nov. 2005, 72 pages.

Nortel, "Proposal for the Downlink Multiple Access Scheme for E-UTRA (Update)", R1-050484, 3GPP TSG-RAN1 Meeting #41, May 2005, 23 pages.

European Patent Office Application Serial No. 06812538.4, Search Report dated May 8, 2014, 11 pages.

* cited by examiner

APPARATUS AND METHOD FOR TRANSMITTING DATA USING A PLURALITY OF CARRIERS

CROSS-REFERENCE TO RELATED APPLICATIONS

This application is a 35 U.S.C. §371 filing of International Application No. PCT/KR2006/004705, filed Nov. 10, 2006. Pursuant to 35 U.S.C. §119(a), this application claims the benefit of earlier filing date and right of priority to Korean Application Nos. 10-2005-0107273, filed Nov. 10, 2005 and 10-2006-0108161, filed Nov. 3, 2006, the contents of all of which are incorporated by reference herein in their entirety. This application further claims the benefit of U.S. Provisional Application Ser. No. 60/862,202, filed Oct. 19, 2006.

TECHNICAL FIELD

The present invention relates to a data transceiving method in a communication system based on a plurality of carriers, and more particularly, to a method of designing a sequence in a communication system using orthogonal subcarriers.

BACKGROUND ART

First of all, OFDM, OFDMA and SC-FDMA schemes used by the present invention are explained as follows.

Recently, the demand for high speed data transmissions rises. And, OFDM, which is suitable for a scheme advantageous for the high speed transmission, has been adopted as a transmission scheme for various high speed communication systems.

In the following description, OFDM (orthogonal frequency division multiplexing) is explained. A basic principle of OFDM lies in dividing a high-rate data stream into a number of slow-rate data streams and transmitting the slow-rate data streams simultaneously using a plurality of carriers. In this case, each of a plurality of the carriers is called a subcarrier. Since orthogonality exists between a plurality of the carriers of OFDM, even if frequency components of the carriers are mutually overlapped, they can be detected by a receiving end. The high-rate data stream is converted to a plurality of slow-rate data streams via a serial-to-parallel converter, a plurality of the parallel-converted data streams are multiplied by subcarriers, respectively, the multiplied data streams are summed up together, and the corresponding sum is then transmitted to the receiving end. So, OFDMA is a multiple access scheme to assign subcarriers to an overall band according to a data rate requested by multiple users in OFDM.

SC-FDMA (single carrier-FDMA) according to a related art is explained as follows.

First of all, the SC-FDMA is called DFT-S-OFDM as well. The related art SC-FDMA is the scheme mainly applicable to uplink. In the SC-FDMA, spreading operation is first applied in a frequency domain by DFT matrix before generating an OFDM signal, the corresponding result is modulated by the conventional OFDM technique, and the modulated result is then transmitted.

To explain the SC-FDMA scheme, several variables are defined. 'N' indicates a number of subcarriers carrying OFDM signal, 'Nb' indicates a number of subcarriers for a random user, 'F' indicates Discrete Fourier Transform matrix, i.e., DFT matrix, 's' indicates a data symbol vector, 'x' indicates a data-spread vector in frequency domain, and 'y' indicates a transmitted OFDM symbol vector in time domain.

In SC-FDMA, data symbol (s) is spread using DFT matrix before being transmitted. This is represented as Formula 1.

$$x = F_{N_b \times N_b} s \quad \text{[Formula 1]}$$

In Formula 1, $F_{N_b \times N_b}$ is an $N_b$-sized DFT matrix used to spread data symbol (s). Subcarrier mapping is performed on the spread vector (x) by a predetermined subcarrier assigning scheme. And, a signal to be transmitted to a receiving end is obtained from transforming the corresponding result into a time domain by an IDFT module. A transmission signal to be transmitted to the receiving end is represented as Formula 2.

$$y = F_{N \times N}^{-1} x \quad \text{[Formula 2]}$$

In Formula 2, $F_{N \times N}^{-1}$ is an N-sized DFT matrix used to convert a frequency-domain signal to a time-domain signal. A cyclic prefix is inserted in a signal 'y' generated by the above method to be transmitted. And, a method of generating a transmission signal and transmitting the signal to a transmitting end in the above manner is called SC-FDMA. And, it is able to control a size of DFT matrix in various ways for a specific purpose.

The above explanation is based on DFT or IDFT operation. Yet, for convenience of explanation, DFT (Discrete Fourier Transform) or FFT Fast Fourier Transform) operation is used without discrimination in-between in the following description. In case that a number of input values of DFT operation is a power of 2, it is apparent to those skilled in the art that DFT operation can be replaced by FFT operation. So, the content for calling the FFT operation is applicable to the DFT operation as it is.

Generally, in an OFDM system, a plurality of OFDM symbols configure one frame to be transmitted and a preamble is first transmitted for each frame or with an interval of several frames. In this case, the number of OFDM symbols configuring the preamble is generated based on requirements of the OFDM system. For instance, in case of OFDMA based IEEE 802.16 system, a preamble including one OFDM symbol for each downlink frame is first transmitted. And, the preamble is provided to a communication terminal for the purpose of synchronization, cell search, channel estimation and the like in a communication system.

The OFDM system is disadvantageous in that a peak-to-average power ratio (hereinafter abbreviated PAPR) of a transmission signal is considerably high. Since an OFDM signal is transmitted by multi-carriers through an IFFT operation, a size of amplitude of an OFDM signal can be represented as a sum of sizes of the multi-carriers. Yet, if phases of the multi-carriers coincide with each other, the OFDM signal becomes a signal having a high value such as an impulse to have a considerably high PAPR. So, the transmission signal according to the OFDM system lowers efficiency of a high output linear amplifier and operates in a non-linear area of the high output amplifier, thereby causing signal distortion.

FIG. 1 is a structural diagram of a downlink subframe in IEEE 802.16 system.

Referring to FIG. 1, the preamble consisting of one OFDM symbol is transmitted ahead each frame and utilized for time and frequency synchronization, cell search, channel estimation and the like.

FIG. 2 is a diagram of a set of subcarriers carrying a preamble transmitted from $0^{th}$ sector in IEEE 802.16 system. Both ends of an assigned bandwidth are used as a guard band. If the number of the sectors is three, each of the sectors is transmitted in a manner of inserting a sequence with an interval of three subcarriers and inserting '0' (zero) in the rest of the subcarriers.

A related art sequence used for the preamble is explained as follows. The sequence used for the preamble is shown in Table 1.

TABLE 1

| Index | ID-cell | sector | Sequence (hexadecimal) |
|---|---|---|---|
| 0 | 0 | 0 | A6F294537B285E1844677D133E4D53CCB1F182D E00489E53E6B6E77065C7EE7D0ADBEAF |
| 1 | 1 | 0 | 668321CBBE7F462E6C2A07E8BBDA2C7F7946D-5F 69E35AC8ACF7D64AB4A33C467001F3B2 |
| 2 | 2 | 0 | 1C75D30B2DF72CEC9117A0BD8EAF8E0502461-FC 07456AC906ADE03E9B5AB5E1D3F98C6E |
| . | . | . | . |
| . | . | . | . |
| . | . | . | . |

The sequence is decided by a sector number and cell ID number. Each defined sequence is converted to a binary signal in an ascending order and is then mapped to a subcarrier through BPSK modulation. In other words, a proposed hexadecimal sequence is converted to a binary sequence (Wk) and the Wk is mapped MSB (most significant bit) to LSB (least significant bit). (0 is mapped by +1 and 1 is mapped by −1. For instance, Wk for hexadecimal 'C12' in $0^{th}$ segment having an index 0 is 110000010010 . . . , a converted binary code value becomes −1 −1 +1 +1 +1 +1 +1 −1 +1 +1 −1 +1 . . . .

The above-explained related art sequence is found by a computer simulation to search types of sequences configured with binary codes for a sequence capable of sustaining prescribed correlation properties and a low PAPR (peak-to-average power ratio) in transform to a time domain. If a system configuration is changed or the sequence is applied to a different system, a new sequence should be found.

A newly proposed sequence used for 3GPP ($3^{rd}$ generation partnership project) LTE (long term evolution) technology is explained as follows.

Various sequences are used for the LTE system. And, a sequence used for a channel of LTE is explained as follows.

First of all, user equipment first carries out synchronization with a base station on a synchronization channel (hereinafter abbreviated SCH) and a cell search to communicate with the base station.

A series of processes for obtaining a cell ID, to which the user equipment belongs and establishing the synchronization with the base station is called a cell search. Generally, the cell search is classified into an initial cell search initially performed by a user equipment's 'power-on' and a neighbor cell search that a user equipment in idle mode searches neighbor base stations.

The SCH (synchronization channel) is able to have a hierarchical structure. For instance, P-SCH (primary SCH) and S-SCH (secondary SCH) are applicable.

The P-SCH and the S-SCH can be included in a radio frame by various methods. FIG. 3 and FIG. 4 are diagrams to explain various methods of including P-SCH and S-SCH in a radio frame. Under various circumstances, SCH can be configured in LTE system according to the structure shown in FIG. 3 or FIG. 4.

Referring to FIG. 3, P-SCH is included in a last OFDM symbol of a first subframe. And, S-SCH is included in a last OFDM symbol of a second subframe.

Referring to FIG. 4, P-SCH is included in a last OFDM symbol of a first subframe. And, S-SCH is included in a last second OFDM symbol of the first subframe.

The LTE system is able to establish time and frequency synchronizations using P-SCH. And, cell group ID, frame synchronization information, antenna configuration information and the like can be included in S-SCH.

A configuring method of P-SCH proposed by the related art 3GPP LTE system is explained as follows.

First of all, P-SCH is transmitted via 1.08 MHz band centering on carrier frequency. This corresponds to seventy-two subcarriers. In this case, an interval between the subcarriers is 15 kHz. This numerical value is decided because twelve subcarriers are defined as one RB (resource block) in the LTE system. In this case, seventy-two subcarriers correspond to six RBs.

The P-SCH, which is used for a communication system using a plurality of orthogonal subcarriers such as OFDM or SC-FDMA, preferably meets the following conditions. First of all, autocorrelation properties should be good in a time domain for to enhance detecting performances of a receiving end.

Secondly, complexity due to synchronization detection should be low.

Thirdly, N× repetition structure is preferable for excellent frequency offset estimation performance.

Fourthly, PAPR (peak-to-average ratio) or CM should be low.

Fifthly, if it is able to utilize P-SCH for channel estimation, a corresponding frequency response preferably has a constant value. In particular, in aspect of channel estimation, it has been known that a flat response in frequency domain has best channel estimation performance.

However, although the related art has proposed various sequences, it is still incapable of meeting the above mentioned various conditions.

DISCLOSURE OF THE INVENTION

Accordingly, the present invention is directed to an apparatus for transmitting data using plurality of carriers and method thereof that substantially obviate one or more of the problems due to limitations and disadvantages of the related art.

An object of the present invention is to provide an apparatus for transmitting data using plurality of carriers and method thereof, by which a sequence having excellent correlation properties can be provided.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting data using a plurality of carriers in a communication system, according to the present invention includes the steps of generating a time-domain sequence with a specific length in a time domain, generating a frequency-domain sequence by performing a DFT or FFT operation on the time-domain sequence according to a length of the generated sequence, including a DC subcarrier and a guard subcarrier in the frequency-domain frequency, and performing an IDFT or IFFT operation on the frequency-domain sequence including the DC subcarrier and the guard subcarrier.

To further achieve these and other advantages and in accordance with the purpose of the present invention, an apparatus for transmitting data using a plurality of carriers includes a sequence generating module generating a time-domain sequence with a specific length in a time domain, a frequency transforming module generating a frequency-domain sequence by performing a DFT or FFT operation on the time-domain sequence according to a length of the generated sequence, a data inserting module enabling a DC subcarrier and a guard subcarrier to be included in the DFT or FFT operation performed frequency-domain frequency, and a module performing an IDFT or IFFT operation on the frequency-domain sequence including the DC subcarrier and the guard subcarrier.

To further achieve these and other advantages and in accordance with the purpose of the present invention, a method of transmitting data using a plurality of carriers in a communication system includes the steps of generating a second sequence by repeating a first sequence in a time domain, transforming the generated second sequence into a frequency-domain sequence using a DFT or FFT operation, performing a data processing on the frequency-domain sequence to allocate a null to a DC subcarrier, and transforming the data-processed frequency-domain sequence into a time-domain sequence by performing an IDFT or IFFT operation on data-processed frequency-domain sequence.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

The present invention proposes two embodiments. In particular, a first embodiment of the present invention proposes an excellent sequence used for various systems. And, a second embodiment of the present invention proposes a sequence used for a synchronization channel of 3GPP LTE system as an example of the first embodiment of the present invention.

First Embodiment

Figure 5A:
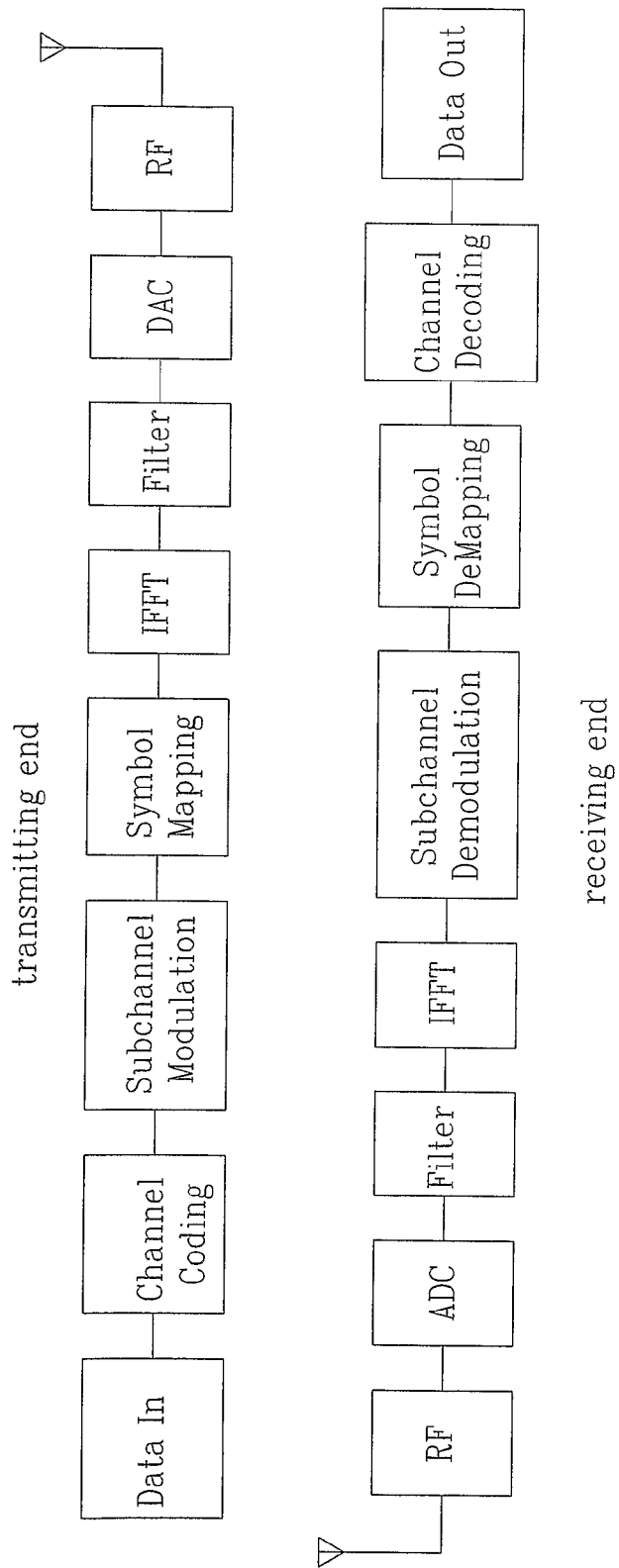
FIG. 5A is a block diagram of transmitting and receiving ends according to one embodiment of the present invention.

FIG. 5A is a structural block diagram of transmitting and receiving ends according to one embodiment of the present invention.

Referring to FIG. 5A, a transmitting end is explained as follows.

First of all, if input data is inputted, channel coding is performed in a manner of adding redundancy bits to prevent the data from being distorted in a channel. The channel coding can be performed using turbo codes, LDPC codes or the like. The channel-coded bit sequence is mapped to a predetermined symbol. And, the corresponding symbol mapping can be performed by QPSK, 16 QAM or the like. The data symbol undergoes subchannel modulation to be mapped to a plurality of subcarriers carrying the symbol. A signal through the subchannel modulation is carried on a carrier in time domain via IFFT and is then transmitted on a radio channel through filtering and analog conversion.

Figure 5B:
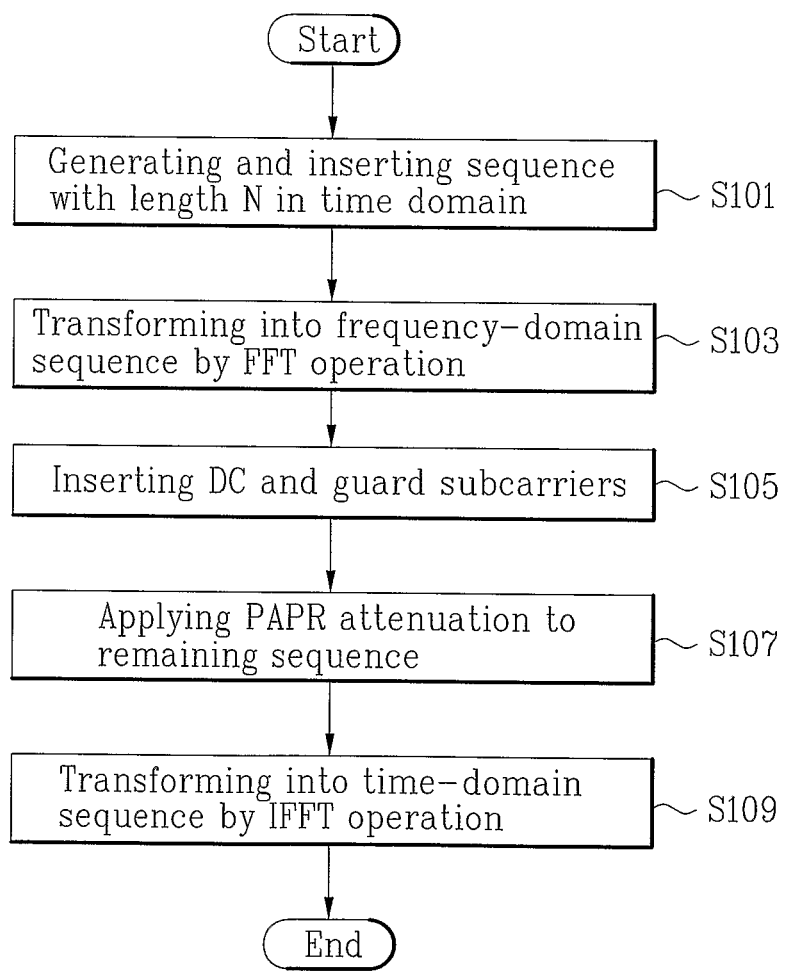
FIG. 5B is a flowchart of a method of designing a time domain of a sequence having low PAPR by maintaining a reasonable correlation properties according to one embodiment of the present invention.

FIG. 5B is a flowchart of a method of designing a sequence in time domain, having low PAPR by maintaining a reasonable correlation properties according to one embodiment of the present invention. A method of generating a preamble according to one embodiment of the present invention is explained with reference to FIG. 5B as follows.

Referring to FIG. 5B, a method of generating a preamble includes a step S101 of generating to insert a sequence having a length N in time domain, a step S103 of transforming the sequence into a frequency-domain sequence through N-point FFT operation, a step S105 of inserting DC (direct current) subcarrier and guard subcarriers according to requirements of a communication system, a step S107 of applying PAPR attenuation scheme to the sequence according to a result of executing the step S105, and a step S109 of transforming the sequence to a time-domain sequence through N-point IFFT (Inverse Fast Fourier Transform). As mentioned in the foregoing description, it is apparent that DFT or FFT can be selectively used according to a value of N.

The respective steps of the method according to one preferred embodiment of the present invention are explained in detail with reference to the attached drawing as follows.

First of all, the step S101 of generating and inserting the sequence having the length N is explained as follows.

One embodiment of the present invention proposes a method of forming and inserting a sequence maintaining a value of constant amplitude. For this, in the present embodiment, a sequence having a specific length is calculated in time domain. And, the calculated sequence is inserted in time domain.

Preferable conditions required for the sequence used in the present embodiment, i.e., the sequence generated and inserted in time domain are explained.

As mentioned in the foregoing description, since a sequence to reduce PAPR is preferable to increase efficiency of an amplifier of a transmitting end, a sequence used by the present embodiment preferably has a value of constant amplitude in time domain. And, the sequence preferably has amplitude of a signal which varies less in frequency domain as well as time domain.

In most of communication methods, a prescribed frequency band is assigned to specific transmitting and receiving ends and a maximum power usable for the assigned frequency band is restricted. In particular, there exists a predetermined spectrum mask in a general communication method. So, even if a sequence having constant amplitude in time domain is transmitted, in case that amplitude of signal in frequency domain is not constant, the sequence may exceed the spectrum mask in case of being boosted in frequency domain.

Since the amplitude in frequency domain can be easily controlled in case of generating and inserting the sequence in frequency domain, the restriction by the spectrum mask will not be significant. Yet, in the present embodiment, the sequence is generated in time domain to be inserted. So, a power value in frequency domain should be taken into consideration. Moreover, if a channel value in frequency domain is previously known, it is preferable that power allocation is performed according to good or poor channel status. Yet, since it is difficult to know a channel in advance due to characteristics of a preamble, a power of subcarrier is normally set constant. Since an FFT module used for the OFDM system includes an N-point FFT module, the sequence preferably has the length of N.

Besides the PAPR characteristic, the sequence used for the present embodiment preferably has good correlation properties to facilitate detection and discrimination of signals. Here, the good correlation properties mean good autocorrelation properties and excellent cross-correlation properties.

Preferably, the sequence is generated to facilitate the receiving end to establish synchronization. Here, the synchronization means frequency synchronization and time synchronization. Generally, if a specific pattern is repeated within one OFDM symbol in time domain, the acquisition of the frequency and time synchronizations is facilitated.

More preferably, the sequence according to the present embodiment has a specific sequence repeated within one OFDM symbol in time domain. For instance, in the sequence generating and inserting step of the present embodiment, it is able to insert a preamble sequence having a same pattern twice in one OFDM symbol generated by the N-point FFT module. There is no limitation put on a method of generating a sequence having a specific length by repeating a same pattern in time domain.

First of all, the following example is possible. In case that an N-point FFT or DFT operation is performed, a sequence having a length N/2 is generated. By inserting the generated sequence repeatedly twice, it is able to configure a preamble sequence having a total length N. By generating a sequence having a length N/4 and inserting the generated sequence repeatedly twice, it is able to configure a preamble sequence having a total length N/2. And, the above-configured N/2 preamble sequence has a length N/2 in frequency domain. In this case, by adjusting an interval of the sequence in frequency domain, it is able to generate a sequence having a length N.

According to one embodiment of the present invention, there exist various sequences that can be selected by considering the aforesaid conditions. As an example of the present embodiment, a method of generating and inserting a sequence having a length 1,024 in time domain using CAZAC sequence is explained. According to the present embodiment, a CAZAC (Constant Amplitude Zero Auto Correlation) [David C. Chu, "Polyphase Codes with Good Periodic Correlation Properties", Information Theory IEEE Transaction on, vol. 18, issue 4, pp. 531-532, July, 1972] sequence having M=1 (M is a natural number as a relative prime number with 1,024) in Formula 3 and length 1,024 is generated in time domain and inserted.

$$a_{n\_Chu} = \exp\left(i\frac{M\pi n^2}{N}\right), \text{ when } N \text{ is even} \quad \text{[Formula 3]}$$

$$a_{n\_Chu} = \exp\left(i\frac{M\pi n(n+1)}{N}\right), \text{ when } N \text{ is odd}$$

In Formula 3, n=0. 1. 2 . . . , N−1.

As mentioned in the foregoing description, a specific pattern used for the present embodiment can be repeated. So, the CAZAC sequence is able to repeat a specific pattern by adjusting a value of N. In particular, by generating CAZAC sequence with M=1 and N=512 in Formula 1 and repeating the generated CAZAC sequence twice, it is able to generate a sequence having a length 1,024.

A PAPR (Peak-to-Average Power Ratio) reducing module 550 may apply a PAPR reducing scheme to the frequency-domain sequence including the DC (Direct Current) subcarrier and the guard subcarrier.

Figure 5C:
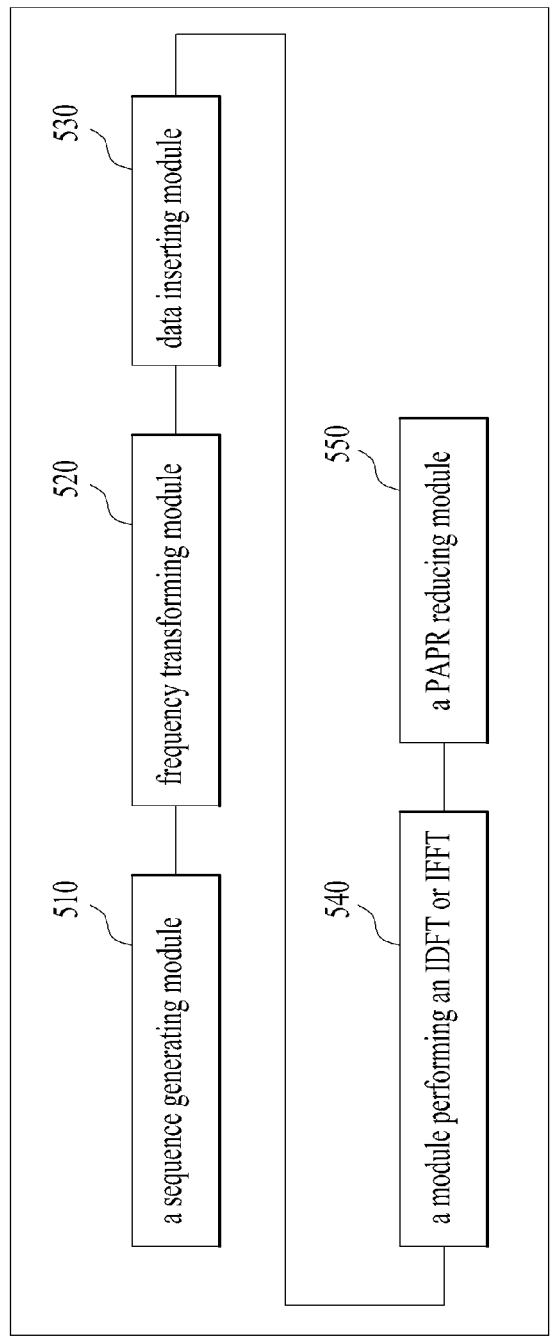
FIG. 5C is a diagram of an apparatus for transmitting data using a plurality of carriers in a communication system in accordance with one embodiment of the present invention.

FIG. 5C is a diagram explaining an example of an apparatus for transmitting data using a plurality of carriers in a communication system in accordance with one embodiment of the present invention. Referring to FIG. 5C, a sequence generating module 510 may generate a time-domain sequence with a specific length in a time domain. A frequency transforming module 520 may generate a frequency-domain sequence by performing a DFT (Discrete Fourier transform) or FFT (Fast Fourier transform) operation on the generated time-domain sequence with the specific length. A data inserting module 530 may insert a DC (Direct Current) subcarrier and a guard subcarrier into the frequency-domain sequence generated by the DFT or FFT operation. In this case, the data inserting module 530 may insert the DC subcarrier into a subcarrier of frequency 0. A module performing an IDFT (Inverse Discrete Fourier transform) or IFFT (Inverse Fast Fourier transform) 540 may perform the IDFT or IFFT operation on the frequency-domain sequence including the DC subcarrier and the guard subcarrier.

Figure 6:
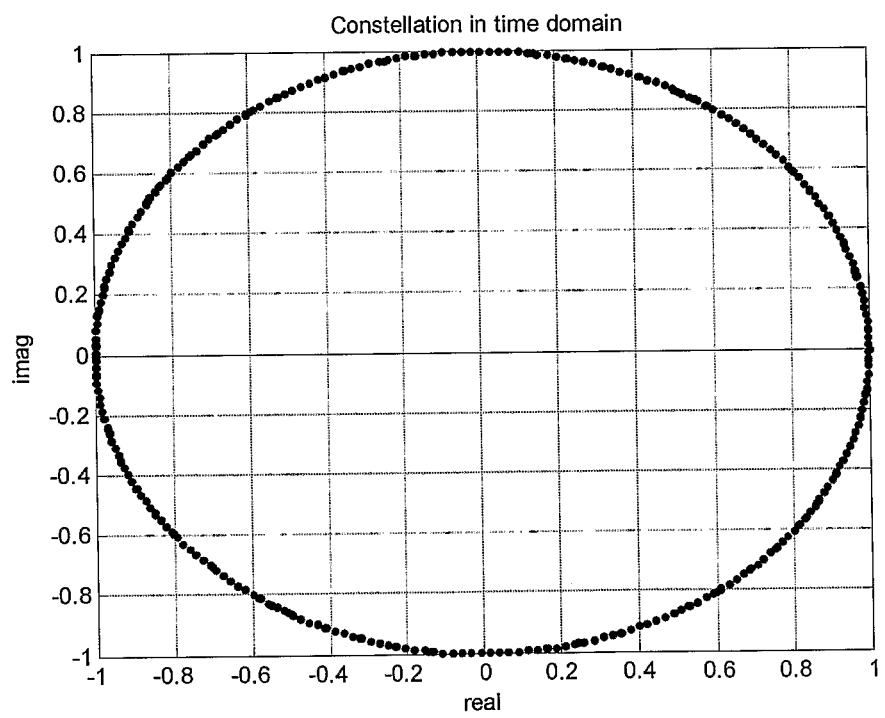
FIG. 6 is a graph of constellation of CAZAC sequence used for an embodiment of the present invention.

FIG. 6 is a graph of constellation of CAZAC sequence used for an embodiment of the present invention.

Referring to FIG. 6, the CAZAC sequence is a polyphase code and has various phases as shown in the drawing. As mentioned in the foregoing description, the present embodiment uses a sequence maintaining constant amplitude in time domain to reduce PAPR. So, the CAZAC shown in the drawing has constant amplitude.

Figure 7:
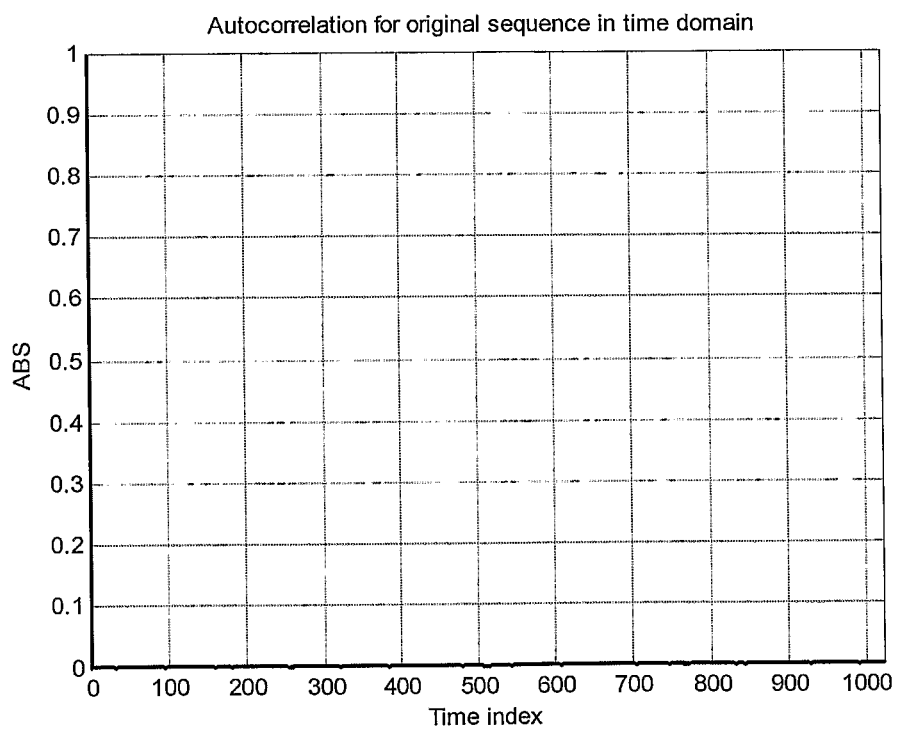
FIG. 7 is a graph of autocorrelation properties of the CAZAC sequence.

FIG. 7 is a graph of autocorrelation properties of the CAZAC sequence.

Referring to FIG. 7, as mentioned in the foregoing description, a sequence used for the present embodiment preferably has excellent correlation properties. So, if looking into autocorrelation properties in time domain for the CAZAC sequence, it is able to know that ideal autocorrelation properties are shown. Consequently, it is able to know that the CAZAC sequence is one of the sequences that meet various conditions requested by the present embodiment.

The step S103 of transforming a time-domain sequence into a frequency-domain sequence through FFT operation according to one embodiment of the present invention is explained as follows.

First of all, a time-domain sequence is transformed into a frequency-domain sequence for the amendment in frequency domain to follow the specifications decided by OFDM system in a following manner. Like Formula 4, a sequence generated in time domain with a length N is transformed into a frequency-domain sequence by performing N-point FFT.

$$A_k = \sum_{n=0}^{N-1} a_n e^{-j2\pi kn/N}$$ [Formula 4]

In Formula 4, k=0, 1, 2, ..., N−1.

As mentioned in the foregoing description, a time-domain sequence generated in time domain is transformed into a frequency-domain sequence $A_k$ by Formula 4.

Figure 8:
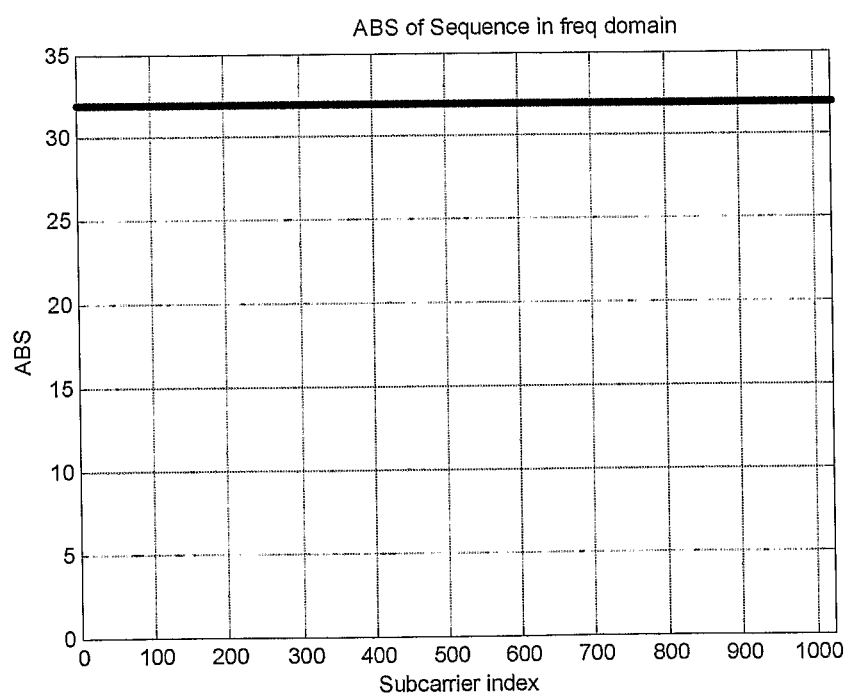
FIG. 8 is a graph of amplitude of a time-domain sequence in a frequency area according to one embodiment of the present invention.
Figure 9:
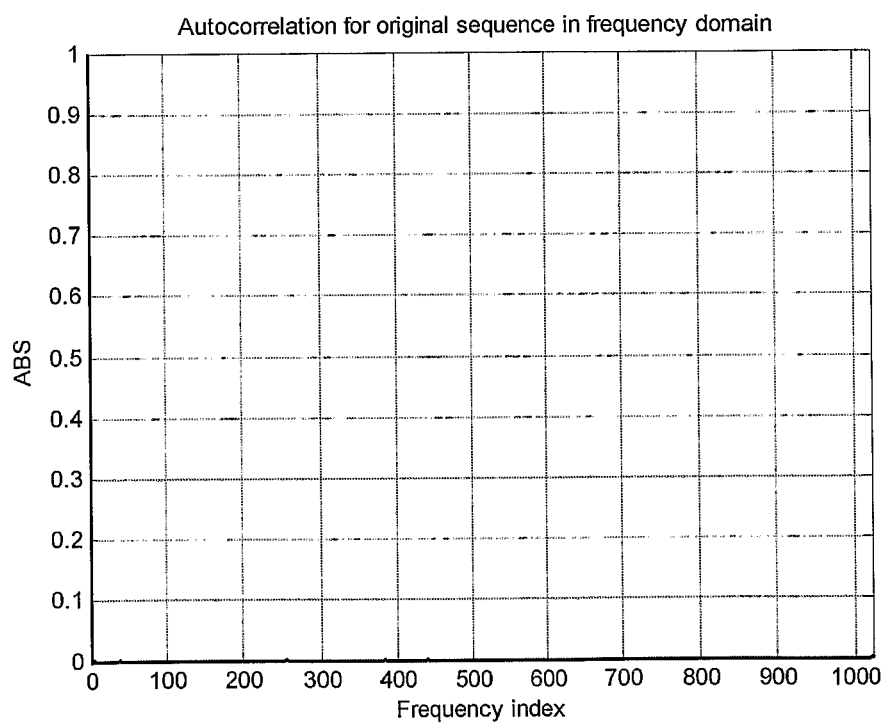
FIG. 9 is a graph of autocorrelation properties of a time-domain sequence in a frequency area according to one embodiment of the present invention.

Frequency domain characteristics for a case that a length of sequence is N=1,024 are shown in FIG. 8 and FIG. 9.

FIG. 8 is a graph of amplitude of a time-domain sequence in a frequency area according to one embodiment of the present invention.

Referring to FIG. 8, as mentioned in the foregoing description, a code sequence used for one embodiment of the present invention preferably needs to have constant amplitude to solve the problem caused by the spectrum mask, which is met by the result shown in FIG. 8.

FIG. 9 is a graph of autocorrelation properties of a time-domain sequence in a frequency area according to one embodiment of the present invention.

Referring to FIG. 9, as mentioned in the foregoing description, a code sequence used for one embodiment of the present invention preferably needs to have good correlation properties, which is met by the result shown in FIG. 9.

The step S105 of inserting the DC subcarrier and the guard subcarrier in the method according to one embodiment of the present invention is explained as follows.

First of all, in a specific OFDM system, an insertion of DC subcarrier and an insertion of predetermined guard subcarrier can be required. In case that DC and guard subcarriers need to be inserted to meet the requirements defined in the specific OFDM system, the step S105 is executed. The DC subcarrier insertion means that data '0' (zero) is inserted in a subcarrier of frequency 0 ('zero') in frequency domain to solve a problem caused by a DC offset in an RF end of transmitting/receiving end. And, the guard subcarrier insertion means that guard subcarriers are inserted to reduce adjacent channel interference (ACI).

Figure 10:
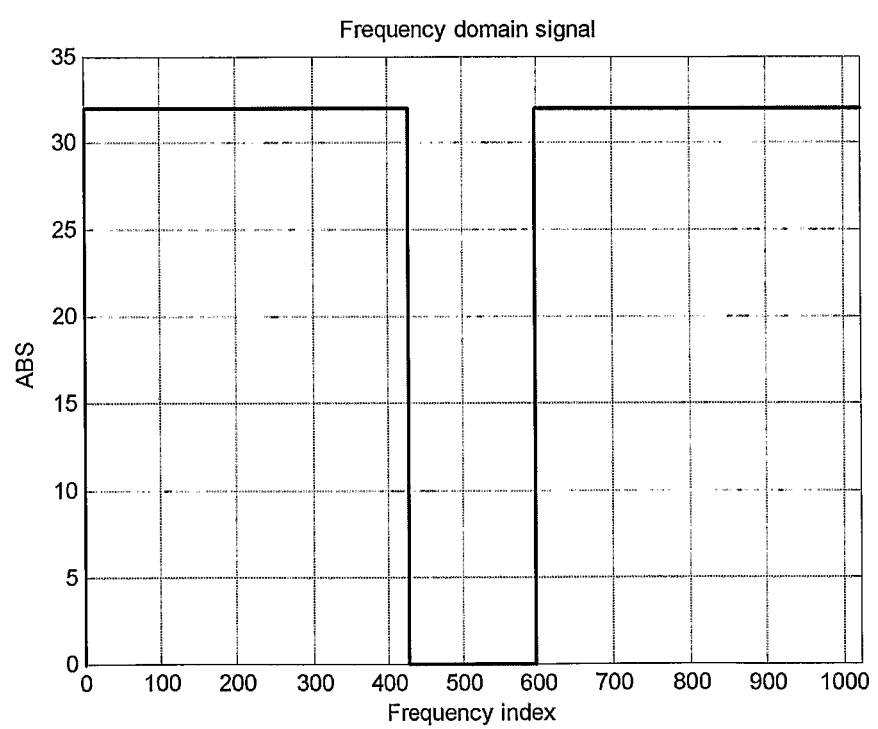
FIG. 10 is a graph of a size for a result from inserting a DC subcarrier and a guard subcarrier according to one embodiment of the present invention.
Figure 11:
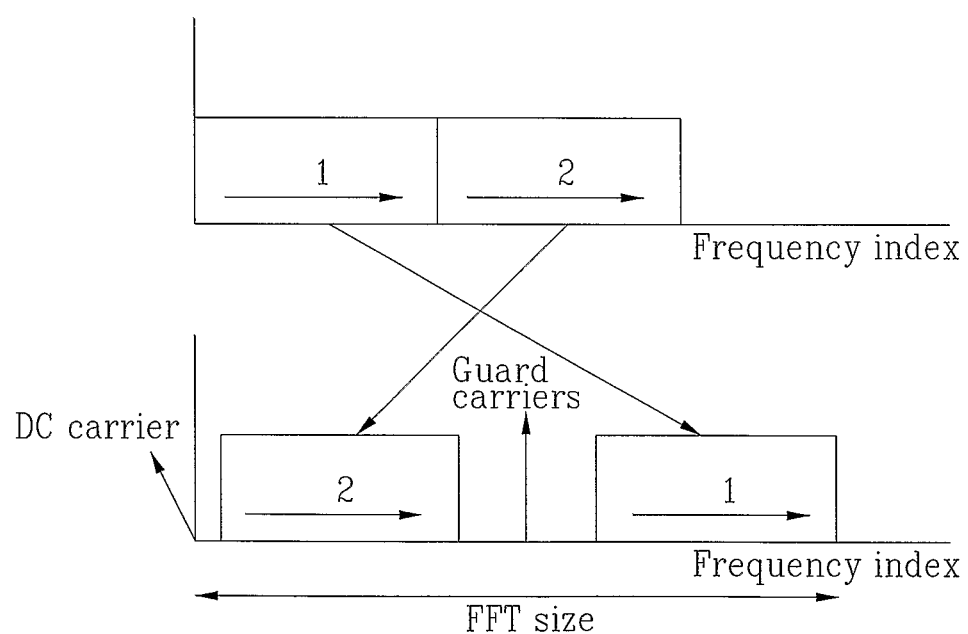
FIG. 11 is a diagram of a method of mapping a sequence according to periodic properties of FFT.

If N=1,024 according to requirements of IEEE 802.16 system, a result of inserting 172 nulls including DC and guard subcarriers is shown in FIG. 10 and FIG. 11.

FIG. 10 is a graph of amplitude for a result from inserting a DC subcarrier and a guard subcarrier according to one embodiment of the present invention.

Referring to FIG. 10, as mentioned in the foregoing description, there exists amplitude of zero at a frequency of zero. And, a guard subcarrier is inserted around a frequency index of 500. The subcarrier can be inserted in various ways. By the periodical properties of FFT, a sequence can be mapped in a manner shown in FIG. 11. In case of the mapping shown in FIG. 11, a guard subcarrier can be inserted in a middle portion of a frequency domain instead of inserting guard subcarriers in both ends of the frequency domain, respectively.

Figure 12:
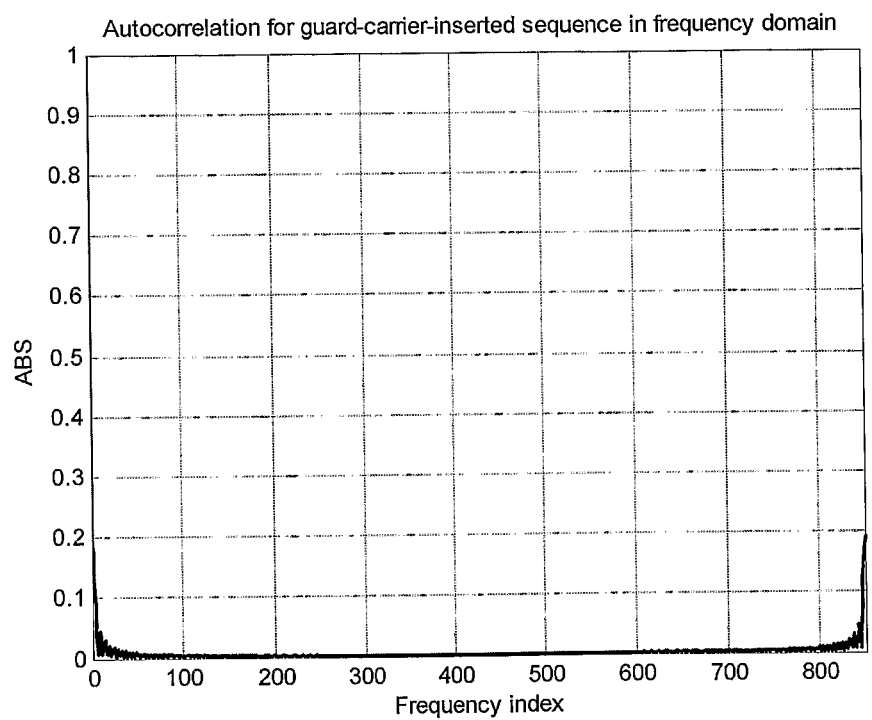
FIG. 12 is a graph of autocorrelation properties in a frequency domain for a result from inserting a DC subcarrier and a guard subcarrier according to one embodiment of the present invention.

FIG. 12 is a graph of autocorrelation properties in a frequency domain for a result from inserting a DC subcarrier and a guard subcarrier according to one embodiment of the present invention.

Referring to FIG. 12, it can be seen that autocorrelation properties after the insertions of the DC subcarrier and the guard subcarrier are very close to ideal correlation properties.

The step S107 of applying the PAPR attenuation scheme to the sequence through the previous steps in the method according to one embodiment of the present invention is explained as follows.

First of all, as mentioned in the foregoing description, as a time-domain signal is transformed by the DC and guard subcarrier insertions, PAPR may be increased. In the present embodiment, the PAPR attenuation scheme can be re-executed to reduce the increased PAPR. In this case, by minimizing the amplitude level variation for codes of a frequency-domain sequence, the PAPR scheme is preferably applied. The frequency-domain sequence through this step is the value already known by the transmitting/receiving ends and can be utilized as a reference signal for other uses (e.g., channel estimation, etc.).

The step S109 of transforming the sequence into a time-domain sequence through IFFT operation of the present invention according to one embodiment of the present invention is explained as follows.

First of all, the step S109 is to generate a final time-domain preamble sequence and is executed by Formula 5. In this case, the generated sequence can be utilized for synchronization execution, signal detection and discrimination, etc.

$$a_n = \frac{1}{N}\sum_{n=0}^{N-1} A_k e^{-j2\pi kn/N}$$ [Formula 5]

Figure 13:
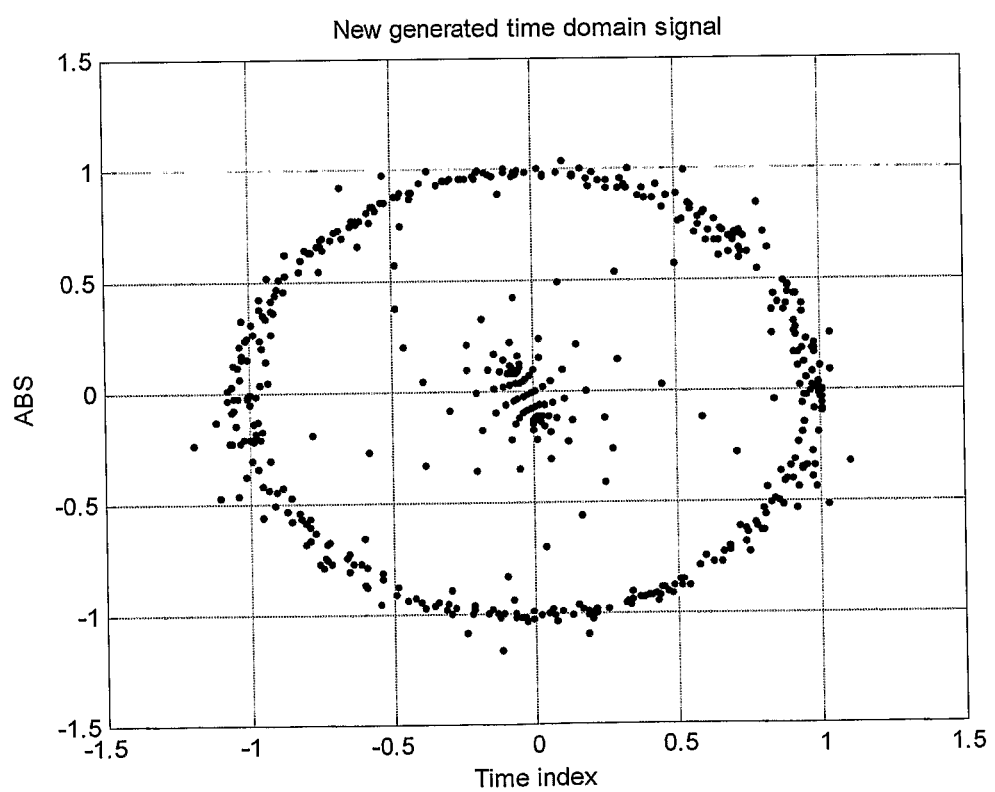
FIG. 13 is a graph of constellation of a final time-domain sequence according to one embodiment of the present invention.
Figure 14:
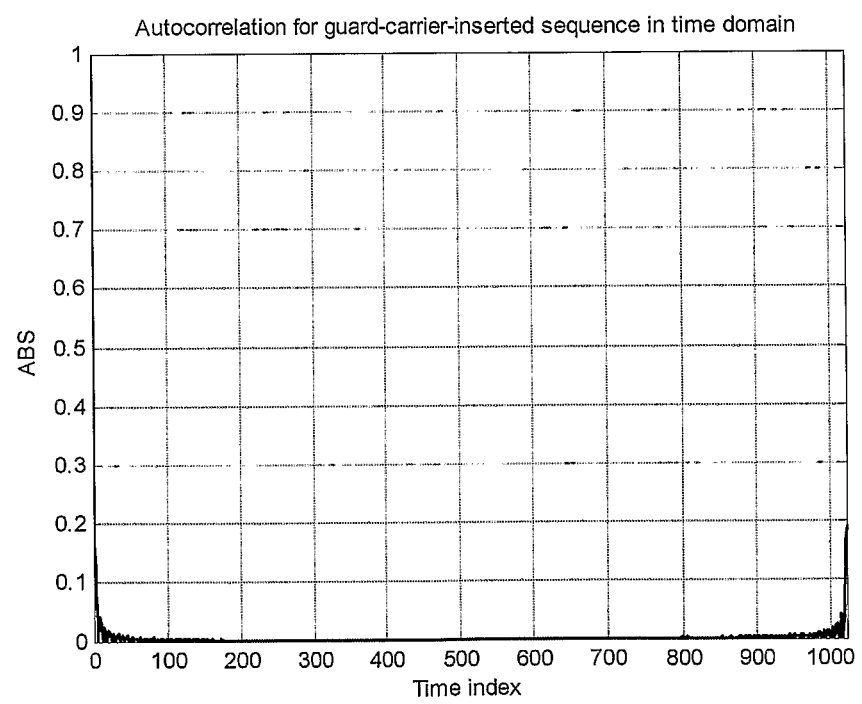
FIG. 14 is a graph of autocorrelation properties in a time domain of a final time-domain sequence according to one embodiment of the present invention.

Results of applying Formula 5 to the case of N=1,024 are shown in FIG. 13 and FIG. 14. FIG. 13 is a graph of constellation of a final time-domain sequence according to one embodiment of the present invention and FIG. 14 is a graph of autocorrelation properties in a time domain of a final time-domain sequence according to one embodiment of the present invention. Referring to FIG. 13 and FIG. 14, the final preamble sequence has excellent properties.

Figure 15:
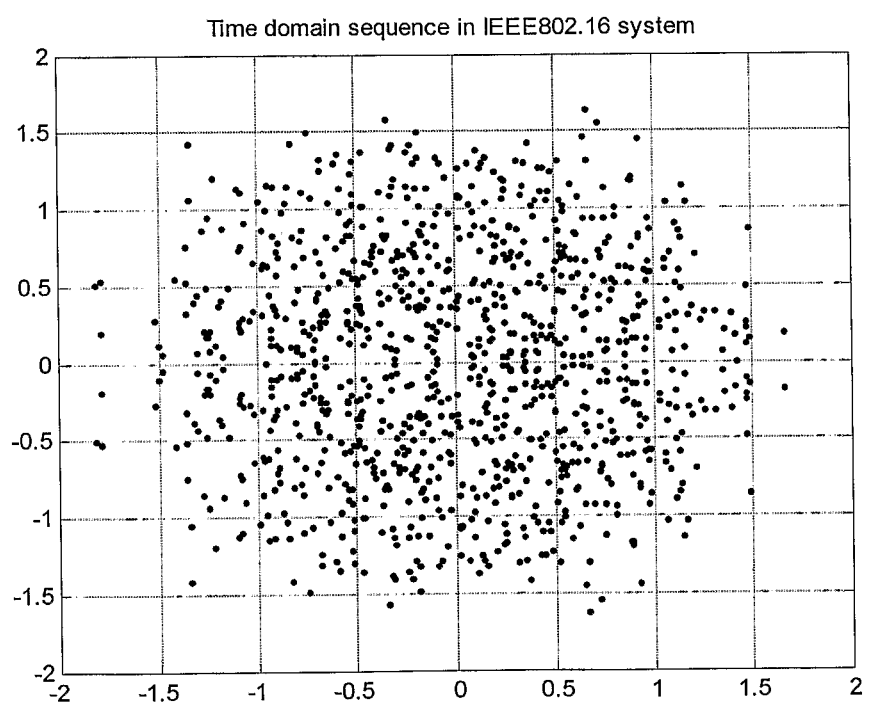
FIG. 15 is a graph of constellation of a final time-domain sequence according to a related art.

FIG. 15 shows a constellation of a sequence for a case of 172 null subcarriers resulting from adding DC and guard subcarriers to a preamble sequence for index 0 and, ID cell 0 and sector 0 in 1024 FFT mode of the IEEE 802.16 system. When the conventional method is applied, a value of PAPR becomes about 5.83 dB. Yet, a value of PAPR of a preamble sequence of the present invention is 2.49 dB. So, the preamble sequence according to the present invention has better performance.

In case of inserting DC and guard subcarriers in generating a sequence, the method according to the present invention is able to generate various kinds of sequences more than the generation in frequency domain.

For instance, in generating the CAZAC sequence of one embodiment of the present invention, the number of subcarriers used for the generation in frequency domain is 852. So, a length of a frequency-domain sequence becomes 852. Hence, total 280 kinds of sequences can be generated because the count of natural numbers as relative prime numbers with 852 among natural numbers below 852 is 280.

On the other hand, the method according to the present invention has a sequence length of 1,024 in time domain. Hence, total 512 kinds of sequences can be generated because the count of natural numbers as relative prime numbers with 1,024 among natural numbers below 1,024 is 512.

Second Embodiment

An example of applying the sequence of the aforesaid first embodiment of the present invention is explained in the following description. In particular, a second embodiment relates to a method of applying one of the CAZAC sequences explained the first embodiment to P-SCH of the LTE system. In more particular, P-SCH is generated by repeating Frank sequence as one of the CAZAC sequences in time domain and processing data in frequency domain.

A second embodiment proposes a sequence that meets all requirements to be met by P-SCH using Frank sequence.

The Frank sequence is a sort of the CAZAC sequence, has constant envelops in both time and frequency domains, and is provided with ideal autocorrelation properties. [R. L. Frank and S. A. Zadoff, "Phase shift pulse codes with good periodic correlation properties", IRE Trans. Inform. Theory, vol. IT-8, pp. 381-382, 1962.]

Meanwhile, in case that P-SCH and S-SCH are multiplexed by FDM in LTE, the discussion for configuring P-SCH using Frank sequence has been proposed. Yet, the method proposed by the second embodiment proposes P-SCH having performance better than that of the formerly proposed method, in case that P-SCH and S-SCH are multiplexed by TDM.

In the following description, the formerly proposed P-SCH configuring method is explained and then compared to the method according to the second embodiment of the present invention.

First of all, Frank sequence can be represented as Formula 6.

$$a_k = e^{\frac{-j2\pi r \cdot l_k}{m}}, (k = 0, 1, \ldots, N-1) \quad \text{[Formula 6]}$$

The $l_k$ is expressed as Formula 7.

$$l_k = \left[\frac{k}{m}\right] \cdot (k \bmod m + 1) \quad \text{[Formula 7]}$$

In Formula 6 and Formula 7, 'N' indicates a length N of Frank sequence and should meet $N = m^2$. And, 'r' is a natural number as a relative prime number below 'm'.

For instance, in case of N=4, Sequences by Formula 6 have a constellation map like BPSK. In case of N=16, Sequences by Formula 6 have a constellation map like QPSK. The generation of Frank sequence in time domain for N=16 and r=1 is shown Table 2. And, a sequence transformed in frequency domain is shown in Table 3.

TABLE 2

| | In phase | Quadrature |
|---|---|---|
| 0 | 0 | 1 |
| 1 | −1 | 0 |
| 2 | 0 | −1 |
| 3 | 1 | 0 |
| 4 | −1 | 0 |
| 5 | 1 | 0 |
| 6 | −1 | 0 |
| 7 | 1 | 0 |
| 8 | 0 | −1 |
| 9 | −1 | 0 |
| 10 | 0 | 1 |
| 11 | 1 | 0 |
| 12 | 1 | 0 |
| 13 | 1 | 0 |
| 14 | 1 | 0 |
| 15 | 1 | 0 |

TABLE 3

| | In phase | Quadrature |
|---|---|---|
| 0 | 1 | 0 |
| 1 | 0 | 1 |
| 2 | −sqrt(½) | sqrt(½) |
| 3 | −sqrt(½) | sqrt(½) |
| 4 | 0 | 1 |
| 5 | 0 | 1 |
| 6 | sqrt(½) | sqrt(½) |
| 7 | sqrt(½) | −sqrt(½) |
| 8 | −1 | 0 |
| 9 | 0 | 1 |
| 10 | sqrt(½) | −sqrt(½) |
| 11 | −sqrt(½) | sqrt(½) |
| 12 | 0 | −1 |
| 13 | 0 | 1 |
| 14 | −sqrt(½) | −sqrt(½) |
| 15 | sqrt(½) | −sqrt(½) |

The result of Table 2 consequently becomes identical to QPSK modulation, and the result of Table 3 has constant amplitude.

For instance, if a number of substantially used subcarriers are 16, the subcarriers can be used regardless of scalable bandwidth using the result of Table 3.

In case that such an operation as a timing acquisition executed in time domain is carried out, if modulation is carried out by BPSK or QPSK, complexity in calculating a correlation value is reduced. In particular, complexity of calculation is reduced since the correlation value is calculated by complex addition using a simple code converter instead of complex operation.

Since Frank sequence is a sort of CAZAC sequence, it shows good correlation properties in both time and frequency domains.

Since Frank sequence has constant values in both time and frequency domains, PAPR is low. And, optimal conditions are provided in case of utilizing the Frank sequence for channel estimation.

For instance, assuming that a signal vector r=[r(0) (r1) . . . r(15)] received in time domain for N=16 and r=1, a correlation value between the signal vector 'r' and a predetermined signal vector 'a' can be calculated by Formula 8. In this case, the signal 'a' follows Table 2.

$$R(d)=r \cdot a \quad \text{[Formula 8]}$$

If an operation is directly conducted according to Formula 8, total 15 complex multiplications and total 15 complex additions are needed to calculate one R(d). Yet, a correlation value can be calculated by executing additions in a manner of changing a sign of a real or imaginary value of a received signal due to a characteristic of Frank sequence 'a'. So, the operation can be completed with 15 complex additions only without the complex multiplications.

In the formerly proposed method, P-SCH is configured using the advantages of the aforesaid Frank sequence. In particular, the proposed method relates to a P-SCH which is multiplexed with the S-SCH by FDM, where the P-SCH is mapped to sixty-four subcarriers using Frank sequence having a length 16.

Figure 16:
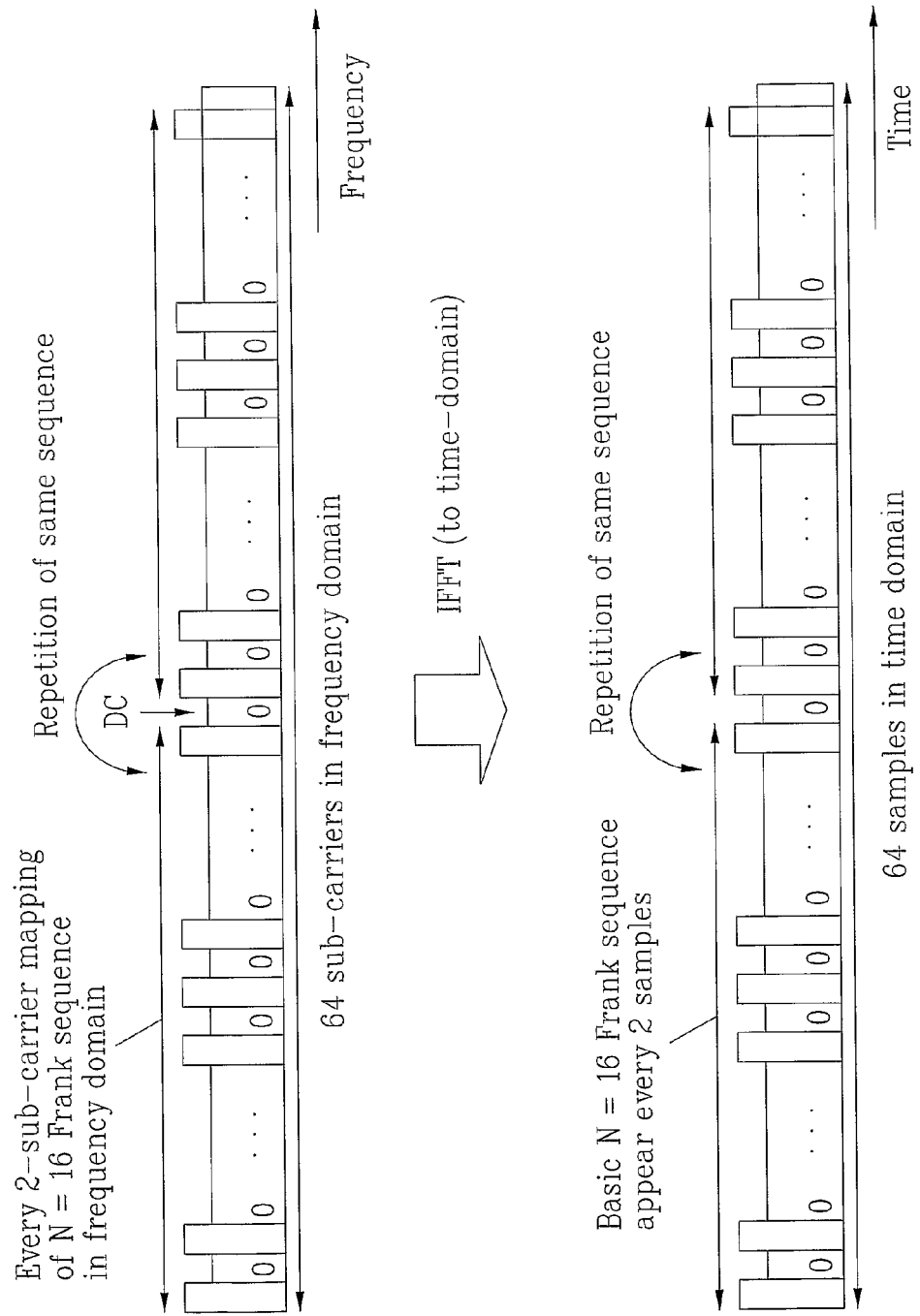
FIG. 16 is a diagram of a method of configuring P-SCH.

FIG. 16 is a diagram of the formerly proposed method of configuring P-SCH.

Referring to FIG. 16, Frank sequence having a length 16 is inserted with two frequency index intervals in frequency domain. In other words, the sequence shown in Table 3 is inserted with two frequency index intervals. The two frequency index intervals mean that an $m^{th}$ sequence is inserted in a $k^{th}$ subcarrier, that a sequence is not inserted in a $(k+1)^{th}$ subcarrier, and that an $(m+1)^{th}$ sequence is inserted in a $(k+2)^{th}$ subcarrier.

If the sequences inserted with two frequency index intervals are copied and extended in frequency domain, it is able to obtain the sequences mapped to total 64 subcarriers like the form shown in FIG. 16. So, the sequences shown in FIG. 16 are configured in the form of being inserted with two sample intervals in time domain. Moreover, the sequences shown in FIG. 16 are repeated twice in time domain.

The second embodiment of the present invention improves the aforesaid P-SCH configuring method in the following manner.

First of all, the sequence according to the formerly proposed P-SCH configuring method has a value of zero in time domain to degrade PAPR properties. So, the second embodiment of the present invention improves the corresponding degradation.

Currently, there exist total 72 subcarriers usable for LTE. Since the formerly proposed method uses 64 subcarriers only, there exists a loss in aspect of frequency diversity. So, the second embodiment of the present invention compensates for the loss.

The formerly proposed method inserts a sequence in an odd subcarrier instead of an even subcarrier to solve the problem due to DC carrier (i.e., $0^{th}$ subcarrier). In other words, data is inserted in a subcarrier having an odd frequency index. If the sequence generated in the above manner is observed in time domain, there occurs a problem that the advantageous form of Frank sequence in time domain (i.e., QPSK form) is altered into another form (i.e., Non-QPSK form). Namely, complexity in complex operation is increased. So, the second embodiment of the present invention solves this problem.

Figure 17:
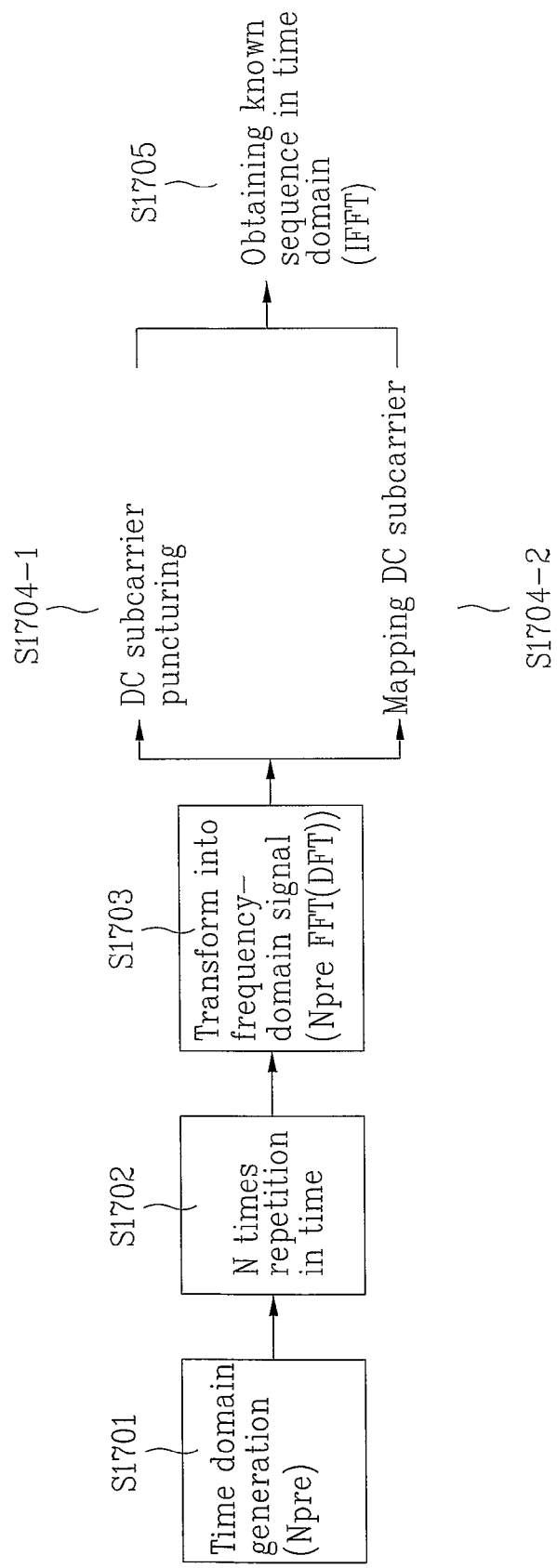
FIG. 17 is a flowchart of a method of configuring P-SCH according to a second embodiment of the present invention.

FIG. 17 is a flowchart of a method of configuring P-SCH according to a second embodiment of the present invention. In FIG. 5B and FIG. 17, it can be seen that a method according to a second embodiment of the present invention is based on the method of the first embodiment of the present invention.

Steps S1701 to 1705 shown in FIG. 17 are explained in detail as follows.

Figure 18:
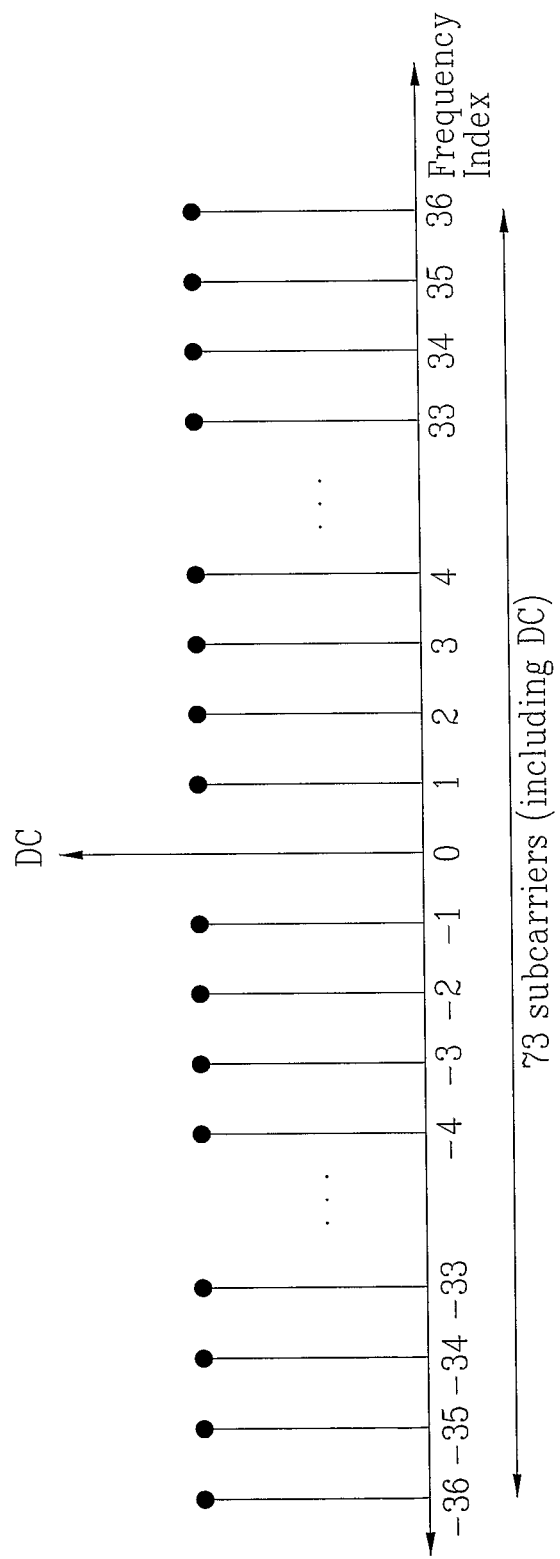
FIG. 18 is a diagram of subcarriers mapped by P-SCH according to LTE specification.

FIG. 18 is a diagram of subcarriers mapped by P-SCH according to LTE specifications.

Referring to FIG. 18, P-SCH of the LTE specifications is mapped to 73 subcarriers (DC subcarrier included) centering on DC subcarrier.

The second embodiment of the present invention provides a structure of sequences repeated twice in time domain to generate sequences to be mapped to 73 subcarriers (DC subcarrier included) requested by the LTE specifications. Namely, the second embodiment of the present invention proposes a sequence having a 2×-repetition structure in time domain. In this case, if data processing for inserting DC subcarrier is executed, Frank sequence having a length of 71 is used among Frank sequence having a length of 72.

Preferably, the sequence repeated twice in time domain is the Frank sequence. Preferably, a length of the Frank sequence is 36 and the variable 'r' in Formula 6 is 1. If a length is 36, the Frank sequence has the constellation map of 6-PSK.

In the second embodiment of the present invention, the length of the Frank sequence is set to 36. This is because sequences to be mapped to 73 subcarriers need to be generated. Namely, if sequences are generated by repeating a length-36 sequence twice, it coincides with the LTE specifications.

If the repetitive form is not intended, it is able to select a length of 64 for the LTE system. In case of generating P-SCH by four times repetitions, a length-16 sequence is usable.

The step S1701 shown in FIG. 17 is explained as follows.

First of all, Frank sequence of $N_{pre}$ (length of initial sequence to generate P-SCH)=36 is generated. In this case, the variable 'r' in Formula 6 is set to 1.

Figure 19:
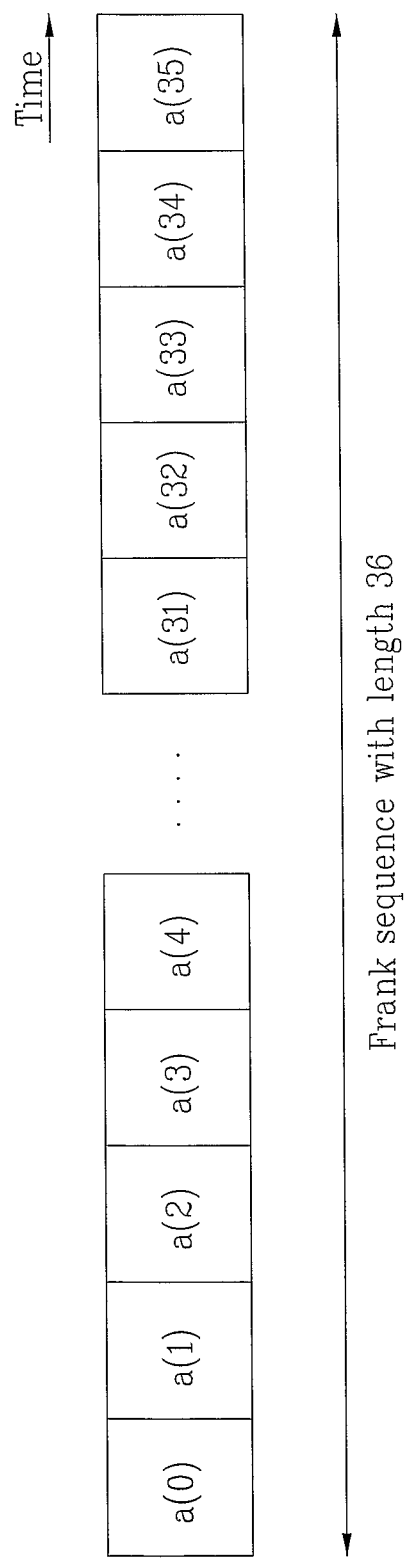
FIG. 19 is a block diagram of Frank sequence with length 36 in time domain.

FIG. 19 is a block diagram of Frank sequence with length 36 in time domain.

Referring to FIG. 19, a sequence can be represented as a(i), where i=0, 1, . . . , 35. Table 4 shows real an imaginary values of 'a(i)' according to an index i. And, Table 4 show sequence values in time domain.

TABLE 4

| | Real | Imag |
|---|---|---|
| 0 | 1 | 0 |
| 1 | −cos(pi/3) | −sin(pi/3) |
| 2 | −1 | 0 |
| 3 | −cos(pi/3) | sin(pi/3) |
| 4 | cos(pi/3) | sin(pi/3) |
| 5 | 1 | 0 |
| 6 | cos(pi/3) | −sin(pi/3) |
| 7 | −cos(pi/3) | sin(pi/3) |
| 8 | 1 | 0 |
| 9 | −cos(pi/3) | −sin(pi/3) |
| 10 | −cos(pi/3) | sin(pi/3) |
| 11 | 1 | 0 |
| 12 | −cos(pi/3) | −sin(pi/3) |

TABLE 4-continued

|  | Real | Imag |
|---|---|---|
| 13 | 1 | 0 |
| 14 | −1 | 0 |
| 15 | 1 | 0 |
| 16 | −1 | 0 |
| 17 | 1 | 0 |
| 18 | −1 | 0 |
| 19 | −cos(pi/3) | −sin(pi/3) |
| 20 | 1 | 0 |
| 21 | −cos(pi/3) | sin(pi/3) |
| 22 | −cos(pi/3) | −sin(pi/3) |
| 23 | 1 | 0 |
| 24 | −cos(pi/3) | sin(pi/3) |
| 25 | −cos(pi/3) | sin(pi/3) |
| 26 | −1 | 0 |
| 27 | −cos(pi/3) | −sin(pi/3) |
| 28 | cos(pi/3) | −sin(pi/3) |
| 29 | 1 | 0 |
| 30 | cos(pi/3) | sin(pi/3) |
| 31 | 1 | 0 |
| 32 | 1 | 0 |
| 33 | 1 | 0 |
| 34 | 1 | 0 |
| 35 | 1 | 0 |

The step S1702 is explained as follows.

Figure 20:
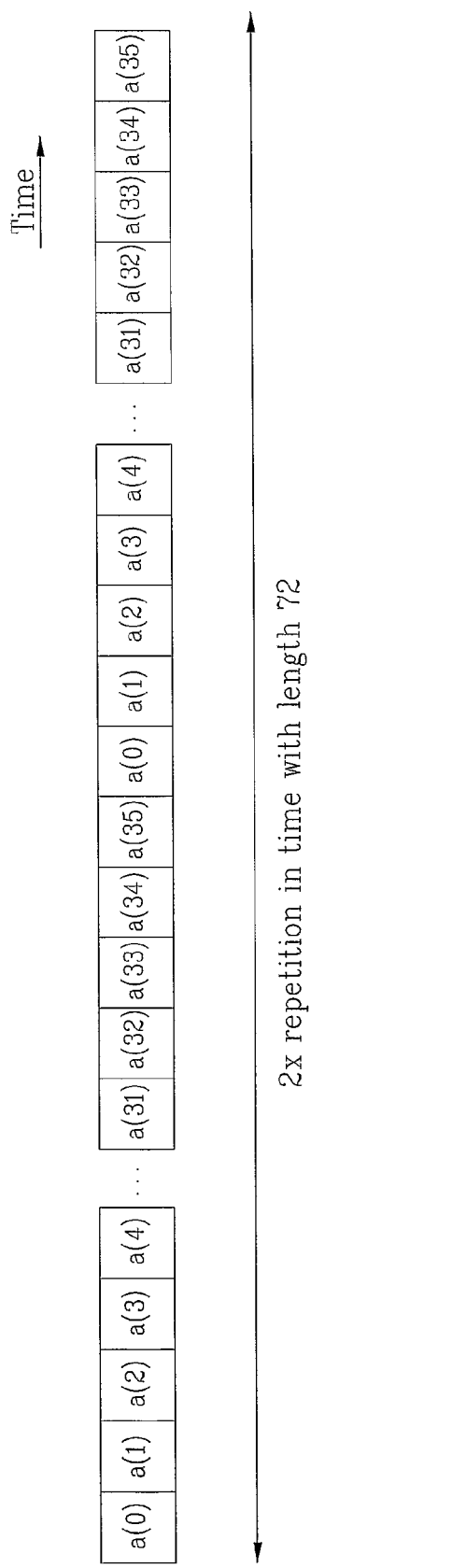
FIG. 20 is a diagram of a result from generating a sequence by two repetitions in time domain according to a second embodiment of the present invention.

First of all, in case of using a sequence with a length 36, sequences are generated by 2×-repetitions in time domain. FIG. 20 is a diagram of a result from generating a sequence by 2×-repetitions in time domain according to a second embodiment of the present invention.

If the twice-repeated signal shown in FIG. 20 is represented as Table 5 using indexes 0 to 71.

TABLE 5

|  | Real | Imag |
|---|---|---|
| 0 | 1 | 0 |
| 1 | −cos(pi/3) | −sin(pi/3) |
| 2 | −1 | 0 |
| 3 | −cos(pi/3) | sin(pi/3) |
| 4 | cos(pi/3) | sin(pi/3) |
| 5 | 1 | 0 |
| 6 | cos(pi/3) | −sin(pi/3) |
| 7 | −cos(pi/3) | sin(pi/3) |
| 8 | 1 | 0 |
| 9 | −cos(pi/3) | −sin(pi/3) |
| 10 | −cos(pi/3) | sin(pi/3) |
| 11 | 1 | 0 |
| 12 | −cos(pi/3) | −sin(pi/3) |
| 13 | 1 | 0 |
| 14 | −1 | 0 |
| 15 | 1 | 0 |
| 16 | −1 | 0 |
| 17 | 1 | 0 |
| 18 | −1 | 0 |
| 19 | −cos(pi/3) | −sin(pi/3) |
| 20 | 1 | 0 |
| 21 | −cos(pi/3) | sin(pi/3) |
| 22 | −cos(pi/3) | −sin(pi/3) |
| 23 | 1 | 0 |
| 24 | −cos(pi/3) | sin(pi/3) |
| 25 | −cos(pi/3) | sin(pi/3) |
| 26 | −1 | 0 |
| 27 | −cos(pi/3) | −sin(pi/3) |
| 28 | cos(pi/3) | −sin(pi/3) |
| 29 | 1 | 0 |
| 30 | cos(pi/3) | sin(pi/3) |
| 31 | 1 | 0 |
| 32 | 1 | 0 |
| 33 | 1 | 0 |
| 34 | 1 | 0 |
| 35 | 1 | 0 |
| 36 | 1 | 0 |

TABLE 5-continued

|  | Real | Imag |
|---|---|---|
| 37 | −cos(pi/3) | −sin(pi/3) |
| 38 | −1 | 0 |
| 39 | −cos(pi/3) | sin(pi/3) |
| 40 | cos(pi/3) | sin(pi/3) |
| 41 | 1 | 0 |
| 42 | −cos(pi/3) | −sin(pi/3) |
| 43 | −cos(pi/3) | sin(pi/3) |
| 44 | 1 | 0 |
| 45 | −cos(pi/3) | −sin(pi/3) |
| 46 | −cos(pi/3) | sin(pi/3) |
| 47 | 1 | 0 |
| 48 | −cos(pi/3) | −sin(pi/3) |
| 49 | 1 | 0 |
| 50 | −1 | 0 |
| 51 | 1 | 0 |
| 52 | −1 | 0 |
| 53 | 1 | 0 |
| 54 | −1 | 0 |
| 55 | −cos(pi/3) | −sin(pi/3) |
| 56 | 1 | 0 |
| 57 | −cos(pi/3) | sin(pi/3) |
| 58 | −cos(pi/3) | −sin(pi/3) |
| 59 | 1 | 0 |
| 60 | −cos(pi/3) | sin(pi/3) |
| 61 | −cos(pi/3) | sin(pi/3) |
| 62 | −1 | 0 |
| 63 | −cos(pi/3) | −sin(pi/3) |
| 64 | cos(pi/3) | −sin(pi/3) |
| 65 | 1 | 0 |
| 66 | cos(pi/3) | sin(pi/3) |
| 67 | 1 | 0 |
| 68 | 1 | 0 |
| 69 | 1 | 0 |
| 70 | 1 | 0 |
| 71 | 1 | 0 |

A value of sequence in Table 5 is a value in time domain.

The step S1703 is explained as follows.

Figure 21:
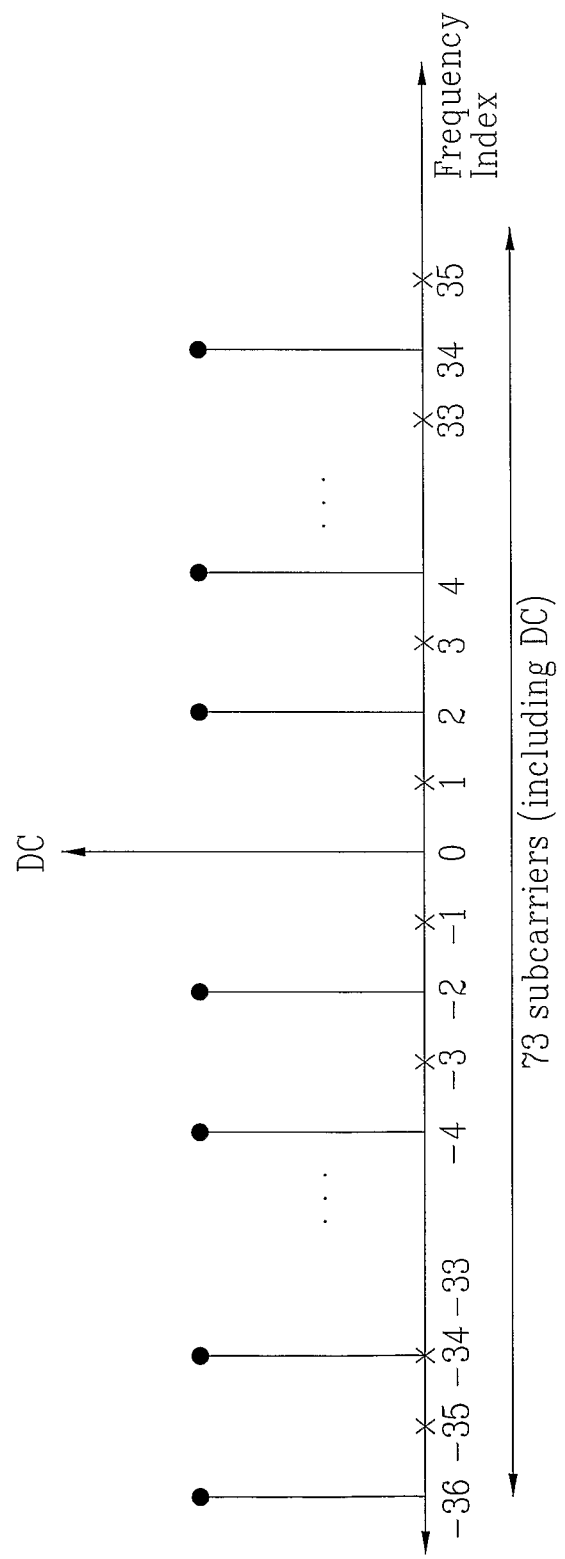
FIG. 21 is a diagram of a result of a step S1703.

First of all, the Frank sequence with length 72 generated in the step S1702 (i.e., the sequence twice repeated in time domain) is transformed into a frequency-domain signal by FFT or DFT. In this case, in aspect of frequency domain, since the repetition in time domain is carried out twice, it seems that alternated insertion is performed from an even-order frequency index in frequency domain. Namely, a sequence, as shown in FIG. 21, is inserted at an even-order frequency index. FIG. 21 is a diagram of a result of the step S1703.

A value of sequence inserted at an even-order frequency index is shown in Table 6.

TABLE 6

|  | Real | Imag |
|---|---|---|
| 0 | Sqrt(2) * 1 | 0 |
| 1 | 0 | 0 |
| 2 | Sqrt(2) * cos(pi/9) | Sqrt(2) * sin(pi/9) |
| 3 | 0 | 0 |
| 4 | Sqrt(2) * cos(3 * pi/9) | Sqrt(2) * sin(3 * pi/9) |
| 5 | 0 | 0 |
| 6 | −Sqrt(2) * cos(3 * pi/9) | Sqrt(2) * sin(3 * pi/9) |
| 7 | 0 | 0 |
| 8 | −Sqrt(2) * cos(pi/9) | −Sqrt(2) * sin(pi/9) |
| 9 | 0 | 0 |
| 10 | Sqrt(2) * 1 | 0 |
| 11 | 0 | 0 |
| 12 | Sqrt(2) * cos(3 * pi/9) | Sqrt(2) * sin(3 * pi/9) |
| 13 | 0 | 0 |
| 14 | −Sqrt(2) * cos(2 * pi/9) | Sqrt(2) * sin(2 * pi/9) |
| 15 | 0 | 0 |
| 16 | −Sqrt(2) * cos(3 * pi/9) | −Sqrt(2) * cos(3 * pi/9) |
| 17 | 0 | 0 |
| 18 | Sqrt(2) * 1 | 0 |

TABLE 6-continued

| | Real | Imag |
|---|---|---|
| 19 | 0 | 0 |
| 20 | −Sqrt(2) * cos(2 * pi/9) | Sqrt(2) * sin(2 * pi/9) |
| 21 | 0 | 0 |
| 22 | Sqrt(2) * 1 | 0 |
| 23 | 0 | 0 |
| 24 | −Sqrt(2) * cos(3 * pi/9) | Sqrt(2) * sin(3 * pi/9) |
| 25 | 0 | 0 |
| 26 | −Sqrt(2) * cos(4 * pi/9) | −Sqrt(2) * sin(4 * pi/9) |
| 27 | 0 | 0 |
| 28 | Sqrt(2) * cos(3 * pi/9) | Sqrt(2) * sin(3 * pi/9) |
| 29 | 0 | 0 |
| 30 | −Sqrt(2) * cos(3 * pi/9) | −Sqrt(2) * sin(3 * pi/9) |
| 31 | 0 | 0 |
| 32 | Sqrt(2) * cos(4 * pi/9) | Sqrt(2) * sin(4 * pi/9) |
| 33 | 0 | 0 |
| 34 | Sqrt(2) * 1 | 0 |
| 35 | 0 | 0 |
| 36[−36] | −Sqrt(2) * 1 | 0 |
| 37[−35] | 0 | 0 |
| 38[−34] | Sqrt(2) * cos(pi/9) | Sqrt(2) * sin(pi/9) |
| 39[−33] | 0 | 0 |
| 40[−32] | −Sqrt(2) * cos(3 * pi/9) | −Sqrt(2) * sin(3 * pi/9) |
| 41[−31] | 0 | 0 |
| 42[−30] | −Sqrt(2) * cos(3 * pi/9) | Sqrt(2) * sin(3 * pi/9) |
| 43[−29] | 0 | 0 |
| 44[−28] | Sqrt(2) * cos(pi/9) | Sqrt(2) * sin(pi/9) |
| 45[−27] | 0 | 0 |
| 46[−26] | Sqrt(2) * 1 | 0 |
| 47[−25] | 0 | 0 |
| 48[−24] | −Sqrt(2) * cos(3 * pi/9) | −Sqrt(2) * sin(3 * pi/9) |
| 49[−23] | 0 | 0 |
| 50[−22] | −Sqrt(2) * cos(2 * pi/9) | Sqrt(2) * sin(2 * pi/9) |
| 51[−21] | 0 | 0 |
| 52[−20] | Sqrt(2) * cos(3 * pi/9) | Sqrt(2)* sin(3 * pi/9) |
| 53[−19] | 0 | 0 |
| 54[−18] | Sqrt(2) * 1 | 0 |
| 55[−17] | 0 | 0 |
| 56[−16] | Sqrt(2) * cos(2 * pi/9) | −Sqrt(2) * sin(2 * pi/9) |
| 57[−15] | 0 | 0 |
| 58[−14] | Sqrt(2) * 1 | 0 |
| 59[−13] | 0 | 0 |
| 60[−12] | Sqrt(2) * cos(3 * pi/9) | −Sqrt(2) * sin(3 * pi/9) |
| 61[−11] | 0 | 0 |
| 62[−10] | −Sqrt(2) * cos(4 * pi/9) | −Sqrt(2) * sin(4 * pi/9) |
| 63[−9] | 0 | 0 |
| 64[−8] | −Sqrt(2) * cos(3 * pi/9) | −Sqrt(2) * sin(3 * pi/9) |
| 65[−7] | 0 | 0 |
| 66[−6] | −Sqrt(2) * cos(3 * pi/9) | −Sqrt(2) * sin(3 * pi/9) |
| 67[−5] | 0 | 0 |
| 68[−4] | −Sqrt(2) * cos(4 * pi/9) | −Sqrt(2) * sin(4 * pi/9) |
| 69[−3] | 0 | 0 |
| 70[−2] | Sqrt(2) * 1 | 0 |
| 71[−1] | 0 | 0 |

The step S1704 is explained as follows.

First of all, the step S1704 is to solve the problem due to DC subcarrier. If communication specifications to be used do not use the DC subcarrier part (i.e., zero is transmitted via DC subcarrier), the step S1704 is preferably executed. The second embodiment of the present invention proposes two kinds of methods of solving the DC subcarrier problem. A step S1704-1 is explained as a first method and a step S1704-2 is then explained as a second method.

The step S1704-1 is explained as follows.

First of all, the step S1704-1 is to perform puncturing (i.e., nullification with 0) on a corresponding sequence located in a DC subcarrier.

Figure 1:
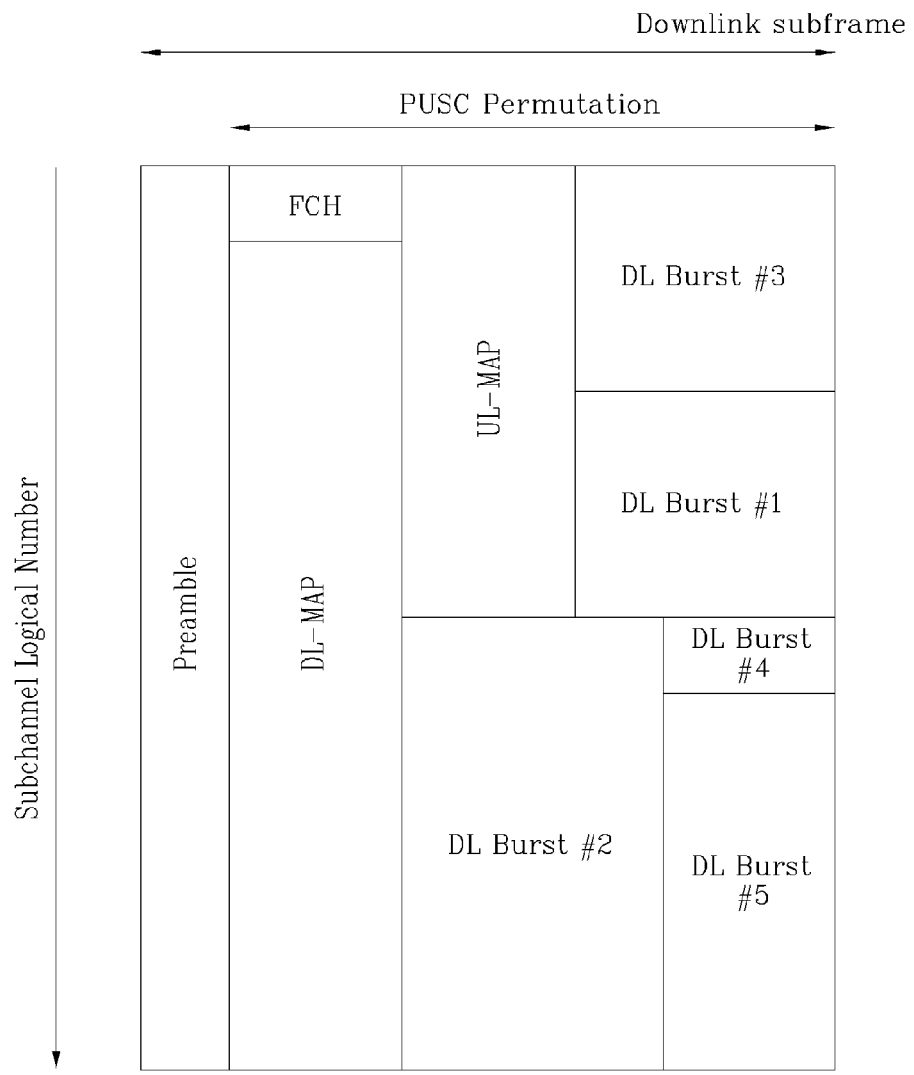
FIG. 1 is a structural diagram of a downlink subframe in IEEE 802.16 system.
Figure 2:
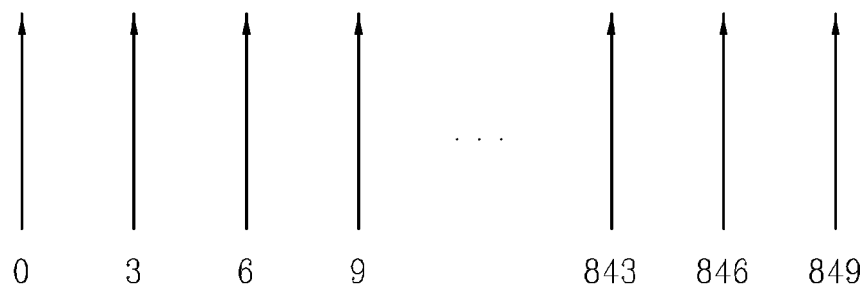
FIG. 2 is a diagram of a set of subcarriers carrying a preamble transmitted from $0^{th}$ sector in IEEE 802.16 system.
Figure 3:
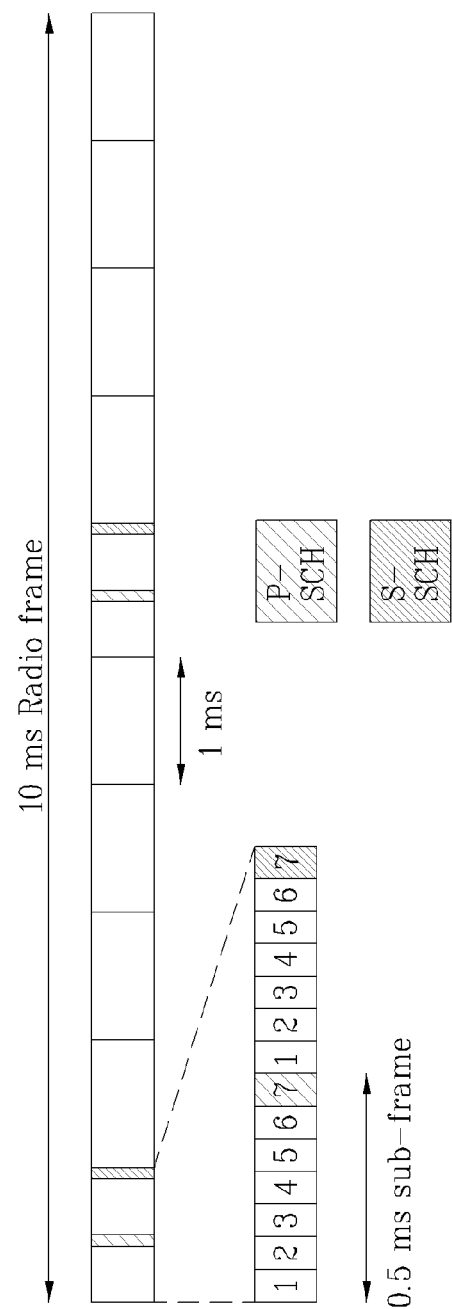
FIG. 3 and FIG. 4 are diagrams to explain various methods of including P-SCH and S-SCH in a radio frame.
Figure 4:
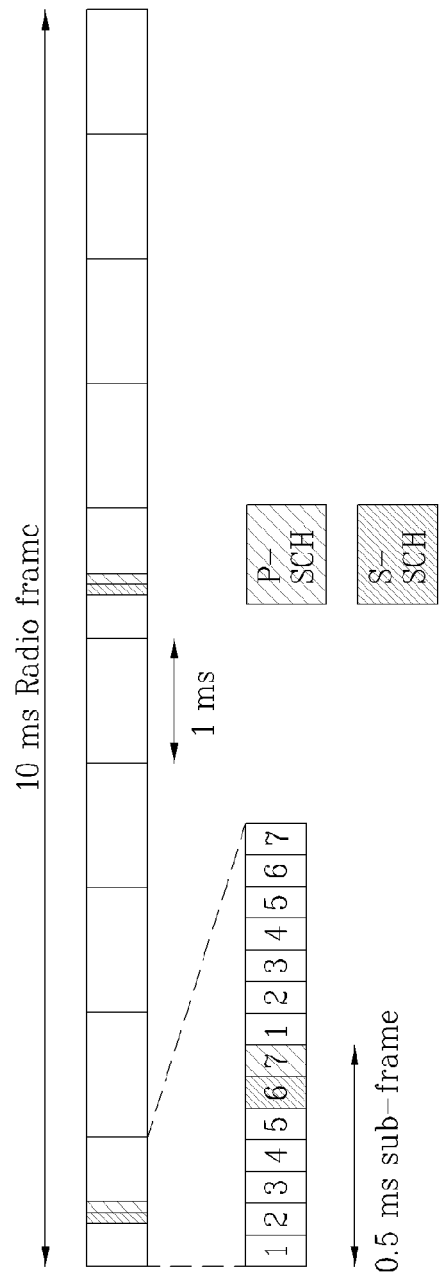
Figure 22:
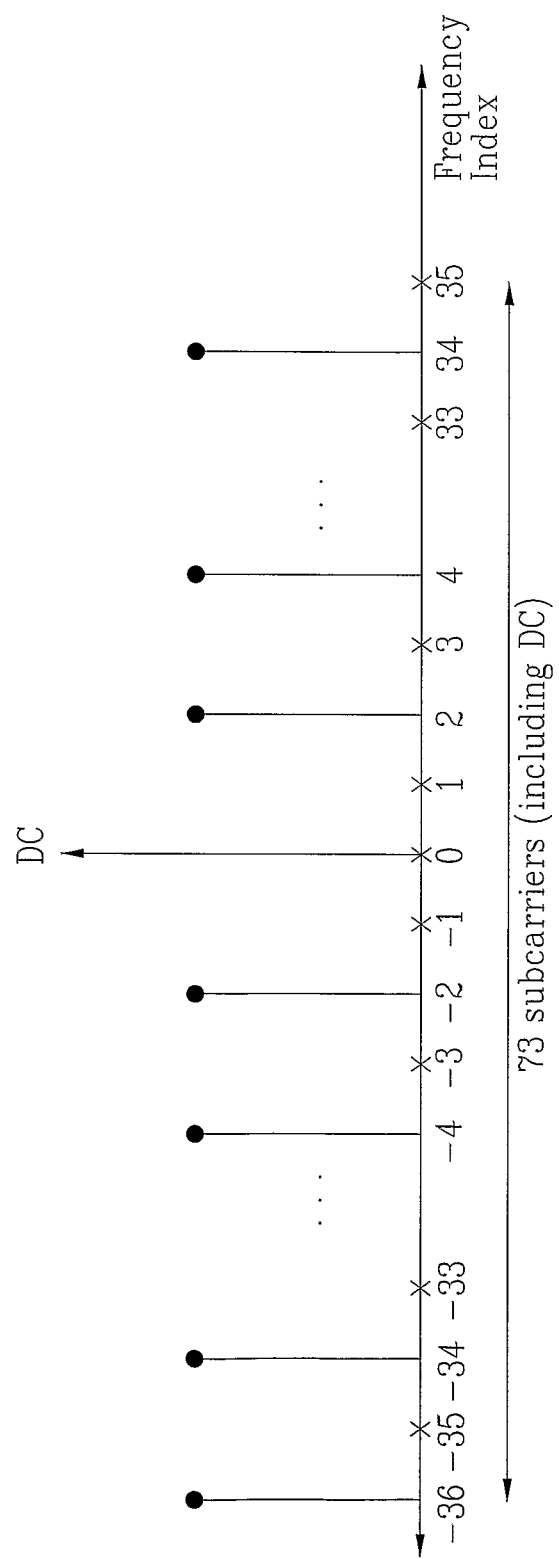
FIG. 22 is a diagram of a result of a step S1704-1.

FIG. 22 is a diagram of a result of the step S1704-1. If the step S1704-1 is carried out on the result of FIG. 21, a result of FIG. 2 can be obtained.

The result of FIG. 22 can be represented as Table 7.

TABLE 7

| | Real | Imag |
|---|---|---|
| 0 | 0 | 0 |
| 1 | 0 | 0 |
| 2 | Sqrt(2) * cos(pi/9) | Sqrt(2) * sin(pi/9) |
| 3 | 0 | 0 |
| 4 | Sqrt(2) * cos(3 * pi/9) | Sqrt(2) * sin(3 * pi/9) |
| 5 | 0 | 0 |
| 6 | −Sqrt(2) * cos(3 * pi/9) | Sqrt(2) * sin(3 * pi/9) |
| 7 | 0 | 0 |
| 8 | −Sqrt(2) * cos(pi/9) | −Sqrt(2) * sin(pi/9) |
| 9 | 0 | 0 |
| 10 | Sqrt(2) * 1 | 0 |
| 11 | 0 | 0 |
| 12 | Sqrt(2) * cos(3 * pi/9) | Sqrt(2) * sin(3 * pi/9) |
| 13 | 0 | 0 |
| 14 | −Sqrt(2) * cos(2 * pi/9) | Sqrt(2) * sin(2 * pi/9) |
| 15 | 0 | 0 |
| 16 | −Sqrt(2) * cos(3 * pi/9) | −Sqrt(2) * cos(3 * pi/9) |
| 17 | 0 | 0 |
| 18 | Sqrt(2) * 1 | 0 |
| 19 | 0 | 0 |
| 20 | −Sqrt(2) * cos(2 * pi/9) | Sqrt(2) * sin(2 * pi/9) |
| 21 | 0 | 0 |
| 22 | Sqrt(2) * 1 | 0 |
| 23 | 0 | 0 |
| 24 | −Sqrt(2) * cos(3 * pi/9) | Sqrt(2) * sin(3 * pi/9) |
| 25 | 0 | 0 |
| 26 | −Sqrt(2) * cos(4 * pi/9) | −Sqrt(2) * sin(4 * pi/9) |
| 27 | 0 | 0 |
| 28 | Sqrt(2) * cos(3 * pi/9) | Sqrt(2) * sin(3 * pi/9) |
| 29 | 0 | 0 |
| 30 | −Sqrt(2) * cos(3 * pi/9) | −Sqrt(2) * sin(3 * pi/9) |
| 31 | 0 | 0 |
| 32 | Sqrt(2) * cos(4 * pi/9) | Sqrt(2) * sin(4 * pi/9) |
| 33 | 0 | 0 |
| 34 | Sqrt(2) * 1 | 0 |
| 35 | 0 | 0 |
| 36[−36] | −Sqrt(2) * 1 | 0 |
| 37[−35] | 0 | 0 |
| 38[−34] | Sqrt(2) * cos(pi/9) | Sqrt(2) * sin(pi/9) |
| 39[−33] | 0 | 0 |
| 40[−32] | −Sqrt(2) * cos(3 * pi/9) | −Sqrt(2) * sin(3 * pi/9) |
| 41[−31] | 0 | 0 |
| 42[−30] | −Sqrt(2) * cos(3 * pi/9) | Sqrt(2) * sin(3 * pi/9) |
| 43[−29] | 0 | 0 |
| 44[−28] | Sqrt(2) * cos(pi/9) | Sqrt(2) * sin(pi/9) |
| 45[−27] | 0 | 0 |
| 46[−26] | Sqrt(2) * 1 | 0 |
| 47[−25] | 0 | 0 |
| 48[−24] | −Sqrt(2) * cos(3 * pi/9) | −Sqrt(2) * sin(3 * pi/9) |
| 49[−23] | 0 | 0 |
| 50[−22] | −Sqrt(2) * cos(2 * pi/9) | Sqrt(2) * sin(2 * pi/9) |
| 51[−21] | 0 | 0 |
| 52[−20] | Sqrt(2) * cos(3 * pi/9) | Sqrt(2) * sin(3 * pi/9) |
| 53[−19] | 0 | 0 |
| 54[−18] | Sqrt(2) * 1 | 0 |
| 55[−17] | 0 | 0 |
| 56[−16] | Sqrt(2) * cos(2 * pi/9) | −Sqrt(2) * sin(2 * pi/9) |
| 57[−15] | 0 | 0 |
| 58[−14] | Sqrt(2) * 1 | 0 |
| 59[−13] | 0 | 0 |
| 60[−12] | Sqrt(2) * cos(3 * pi/9) | −Sqrt(2) * sin(3 * pi/9) |
| 61[−11] | 0 | 0 |
| 62[−10] | −Sqrt(2) * cos(4 * pi/9) | −Sqrt(2) * sin(4 * pi/9) |
| 63[−9] | 0 | 0 |
| 64[−8] | −Sqrt(2) * cos(3 * pi/9) | −Sqrt(2) * sin(3 * pi/9) |
| 65[−7] | 0 | 0 |
| 66[−6] | −Sqrt(2) * cos(3 * pi/9) | −Sqrt(2) * sin(3 * pi/9) |
| 67[−5] | 0 | 0 |
| 68[−4] | −Sqrt(2) * cos(4 * pi/9) | −Sqrt(2) * sin(4 * pi/9) |
| 69[−3] | 0 | 0 |
| 70[−2] | Sqrt(2) * 1 | 0 |
| 71[−1] | 0 | 0 |

The step S1704-2 is explained as follows.

First of all, the step S1704-2 of the method according to the second embodiment of the present invention is to perform mapping on a corresponding sequence by avoiding DC subcarrier.

In the aforesaid step S1702, a sequence is twice repeated in time domain. So, the result of the step S1703 also has the form of inserting a sequence with two frequency index intervals in frequency domain. In other words, a sequence is inserted at an odd-order frequency index.

Figure 23:
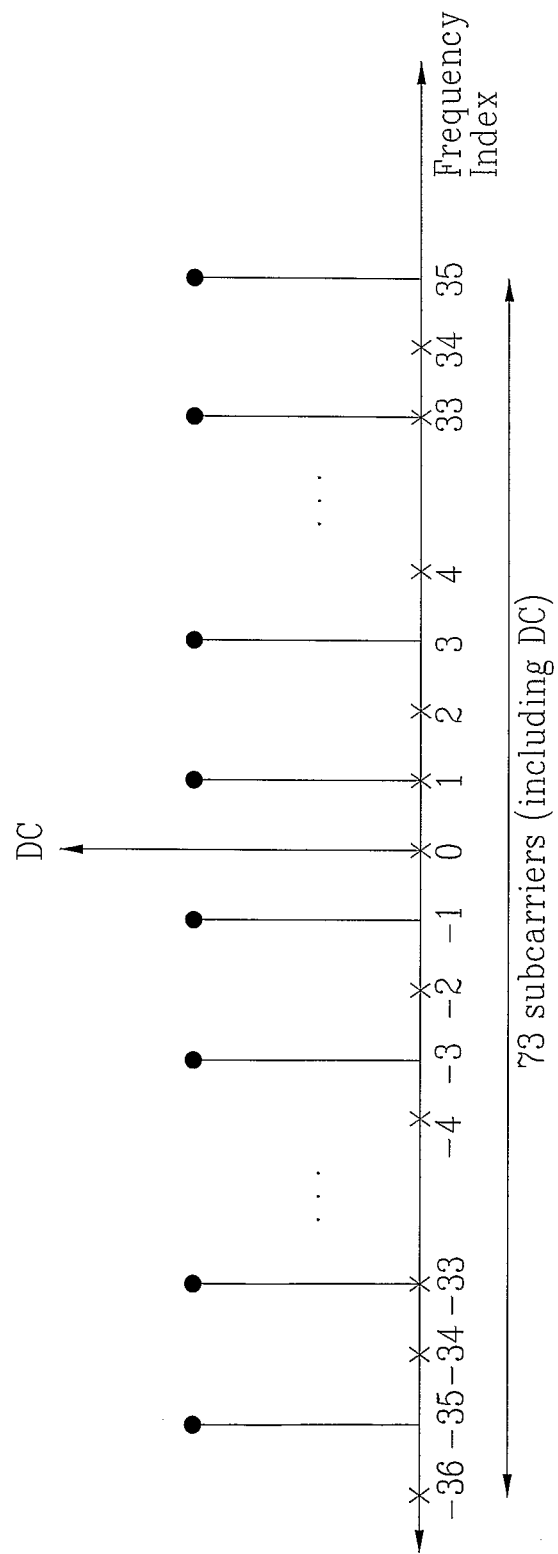
FIG. 23 is a diagram of a result of performing a circular shift on the result shown in FIG. 21 in a right direction.

In this case, the step S1704 of the second embodiment is carried out to perform a circular shift on a generated sequence in a right or left direction. FIG. 23 is a diagram of a result of performing a circular shift on the result shown in FIG. 21 in a right direction.

The result of FIG. 23 can be represented as Table 8.

TABLE 8

|  | Real | Imag |
|---|---|---|
| 0 | 0 | 0 |
| 1 | Sqrt(2) * 1 | 0 |
| 2 | 0 | 0 |
| 3 | Sqrt(2) * cos(pi/9) | Sqrt(2) * sin(pi/9) |
| 4 | 0 | 0 |
| 5 | Sqrt(2) * cos(3 * pi/9) | Sqrt(2) * sin(3 * pi/9) |
| 6 | 0 | 0 |
| 7 | −Sqrt(2) * cos(3 * pi/9) | Sqrt(2) * sin(3 * pi/9) |
| 8 | 0 | 0 |
| 9 | −Sqrt(2) * cos(pi/9) | −Sqrt(2) * sin(pi/9) |
| 10 | 0 | 0 |
| 11 | Sqrt(2) * 1 | 0 |
| 12 | 0 | 0 |
| 13 | Sqrt(2) * cos(3 * pi/9) | Sqrt(2) * sin(3 * pi/9) |
| 14 | 0 | 0 |
| 15 | −Sqrt(2) * cos(2 * pi/9) | Sqrt(2) * sin(2 * pi/9) |
| 16 | 0 | 0 |
| 17 | −Sqrt(2) * cos(3 * pi/9) | −Sqrt(2) * cos(3 * pi/9) |
| 18 | 0 | 0 |
| 19 | Sqrt(2) * 1 | 0 |
| 20 | 0 | 0 |
| 21 | −Sqrt(2) * cos(2 * pi/9) | Sqrt(2) * sin(2 * pi/9) |
| 22 | 0 | 0 |
| 23 | Sqrt(2) * 1 | 0 |
| 24 | 0 | 0 |
| 25 | −Sqrt(2) * cos(3 * pi/9) | Sqrt(2) * sin(3 * pi/9) |
| 26 | 0 | 0 |
| 27 | −Sqrt(2) * cos(4 * pi/9) | −Sqrt(2) * sin(4 * pi/9) |
| 28 | 0 | 0 |
| 29 | Sqrt(2) * cos(3 * pi/9) | Sqrt(2) * sin(3 * pi/9) |
| 30 | 0 | 0 |
| 31 | −Sqrt(2) * cos(3 * pi/9) | −Sqrt(2) * sin(3 * pi/9) |
| 32 | 0 | 0 |
| 33 | Sqrt(2) * cos(4 * pi/9) | Sqrt(2) * sin(4 * pi/9) |
| 34 | 0 | 0 |
| 35 | Sqrt(2) * 1 | 0 |
| 36[−36] | 0 | 0 |
| 37[−35] | −Sqrt(2) * 1 | 0 |
| 38[−34] | 0 | 0 |
| 39[−33] | Sqrt(2) * cos(pi/9) | Sqrt(2) * sin(pi/9) |
| 40[−32] | 0 | 0 |
| 41[−31] | −Sqrt(2) * cos(3 * pi/9) | −Sqrt(2) * sin(3 * pi/9) |
| 42[−30] | 0 | 0 |
| 43[−29] | −Sqrt(2) * cos(3 * pi/9) | Sqrt(2) * sin(3 * pi/9) |
| 44[−28] | 0 | 0 |
| 45[−27] | Sqrt(2) * cos(pi/9) | Sqrt(2) * sin(pi/9) |
| 46[−26] | 0 | 0 |
| 47[−25] | Sqrt(2) * 1 | 0 |
| 48[−24] | 0 | 0 |
| 49[−23] | −Sqrt(2) * cos(3 * pi/9) | −Sqrt(2) * sin(3 * pi/9) |
| 50[−22] | 0 | 0 |
| 51[−21] | −Sqrt(2) * cos(2 * pi/9) | Sqrt(2) * sin(2 * pi/9) |
| 52[−20] | 0 | 0 |
| 53[−19] | Sqrt(2) * cos(3 * pi/9) | Sqrt(2) * sin(3 * pi/9) |
| 54[−18] | 0 | 0 |
| 55[−17] | Sqrt(2) * 1 | 0 |
| 56[−16] | 0 | 0 |
| 57[−15] | Sqrt(2) * cos(2 * pi/9) | −Sqrt(2) * sin(2 * pi/9) |
| 58[−14] | 0 | 0 |
| 59[−13] | Sqrt(2) * 1 | 0 |
| 60[−12] | 0 | 0 |
| 61[−11] | Sqrt(2) * cos(3 * pi/9) | −Sqrt(2) * sin(3 * pi/9) |
| 62[−10] | 0 | 0 |
| 63[−9] | −Sqrt(2) * cos(4 * pi/9) | −Sqrt(2) * sin(4 * pi/9) |
| 64[−8] | 0 | 0 |
| 65[−7] | −Sqrt(2) * cos(3 * pi/9) | −Sqrt(2) * sin(3 * pi/9) |
| 66[−6] | 0 | 0 |
| 67[−5] | −Sqrt(2) * cos(3 * pi/9) | −Sqrt(2) * sin(3 * pi/9) |
| 68[−4] | 0 | 0 |
| 69[−3] | −Sqrt(2) * cos(4 * pi/9) | −Sqrt(2) * sin(4 * pi/9) |
| 70[−2] | 0 | 0 |
| 71[−1] | Sqrt(2) * 1 | 0 |

Comparing the step S1704-1 and the step S1704-2, the step S1704-1 is more preferable than the step S1704-2. The step S1704-1 enables a correlation value to be calculated by simple operation using the known signals of Table 5. A detailed method of calculating the correlation value is explained in the following description. Yet, since a value of a time-domain sequence is changed by inserting a sequence at an odd-order index, it is difficult for the step S1704-2 to find the correlation value by simple operation. Of course, it can be solved in a manner that the receiving end receives a carrier frequency by shifting the carrier frequency with a subcarrier spacing. Yet, this can cause a problem of DC offset generation since a first subcarrier becomes a DC component. So, The step S1704-1 is preferable. Of course, a frequency shift can be performed by multiplying a specific complex number in time domain after reception. Yet, efficiency of the method of multiplying the specific complex number for the simple correlation value calculation is too low.

The step S1705 is explained as follows.

First of all, the step S1705 is an additional step for the case of applying 128-point FFT without performing down-sampling in the receiving end.

The step S1705 may be useful in case that the receiving end does not support down-sampling. In case of the LTE system for example, a subcarrier spacing is 15 KHz. In case of applying 128-point FFT or DFT, 128 sample values are generated in time domain, which have a sampling frequency of 1.9 MHz. After having filtered a received signal at 1.08 MHz, the receiving end is able to do one of the following operations. A first operation is to use a sampling frequency of 1.92 MHz (frequency corresponding to 72 samples) as it is. A second operation is to use it by down-sampling with a sampling frequency of 1.08 MHz (frequency corresponding to 72 samples. The step S1705 is an additional step for the case of using the sampling frequency of 1.92 MHz without performing down-sampling by receiving end.

In case that up-sampling needs to be done, the step S1705 performs up-sampling on a sequence generated with 1.08 MHz (frequency corresponding to 72 samples). A digital sampling method is based on performing zero-padding on 56 (=128-72) subcarriers and performing 128-point IFFT on corresponding results. A detailed sampling scheme is known to those skilled in the art of the present invention, of which additional explanation is omitted. For reference, the sequence shown in Table 7 or Table 8 is used within a corresponding band, i.e., a band of 1.08 MHz in transmission.

An operation of a transmitting end having received the P-SCH sequence proposed by the second embodiment of the present invention is explained in the following description. Namely, cross-correlation in a receiving end is explained as follows.

Since the above-explained example has a form repeated twice in time domain, after a prescribed range of a received signal has been decided using auto-correlation, a step for fine synchronization can be executed using cross-correlation for the decided range. Since the method of deciding the prescribed range of the received signal repeated by auto-correlation adopts a conventional method as it is, a method of reducing an operation quantity through cross-correlation is explained only in the following description.

A timing acquiring method through cross-correlation can be represented as Formula 9.

$$\hat{d} = \underset{d}{\mathrm{argmax}}\{R(d) \mid 0 \le d \le N_f - 1\} R(d) =$$

$$\left(\sum_{m=0}^{M-1} \left|\sum_{n=mL}^{(m+1)L-1} p^*(n) r(d+n)\right|^2\right) \Big/ \left(\sum_{n=0}^{N_{fft}/2-1} |r(d+n)|^2\right) +$$

$$\left(\sum_{m=0}^{M-1} \left|\sum_{n=mL}^{(m+1)L-1} p^*\!\left(\frac{N_{fft}}{2}+n\right) r\!\left(\frac{N_{fft}}{2}+d+n\right)\right|^2\right) \Big/$$

$$\left(\sum_{n=0}^{N_{fft}/2-1} \left|r\!\left(\frac{N_{fft}}{2}+d+n\right)\right|^2\right) (N_{fft}/2 = ML)$$

[Formula 9]

In Formula 9, p(n), r(n), M, $N_{fft}$, $\hat{d}$ indicate a P-SCH sequence value known in time domain, a received signal, a value of M for partial correlation, FFT amplitude and detected time synchronization position, respectively.

In case that repetition pattern does not exist in P-SCH, if a frequency offset on 2 GHz band is maximum 5 ppm, sufficient performance can be provided if M=2. So, since the above-explained example uses the twice repetition structure, sufficient performance can be provided in Formula 9 if M=1. Hence, it is unnecessary to apply the partial correlation within repeated intervals.

In the LTE system based on Formula 9, since a received signal is down-sampled with a sampling frequency of 1.08 MHz (72 samples) and since two symbols of P-SCH exist within 10 ms, in case of acquiring a time synchronization on average for 5 ms interval, complexity of calculation for timing acquisition is represented as Formula 10.

(72-times complex multiplications+72-times complex additions+two-times complex square operation)*9,600     [Formula 10]

To explain a correlation value calculating method according to the present invention, Frank sequence shown in Table 4 is taken as an example.

If a received signal r=[r(0) r(1) r(2) . . . r(35)], an operation of the correlation value of Table 4 with the received signal is processed in parallel as follows.

First of all, a real value is processed as Formula 11a.

Real value: Real[r(0)]−Real[r(2)]+Real[r(5)]+Real[r(8)]+Real[r(11)]+Real[r(13)]−Real[r(14)]+Real[r(15)]−Real[r(16)]+Real[r(17)]−Real[r(18)]+Real[r(20)]+Real[r(23)]−Real[r(26)]+Real[r(29)]+Real[r(31)]+Real[r(32)]+Real[r(33)]+Real[r(34)]+Real[r(35)]+cos(pi/3)*−Real[r(1)]−Real[r(3)]+Real[r(4)]+Real[r(6)]−Real[r(7)]−Real[r(9)]−Real[r(10)]−Real[r(12)]−Real[r(19)]−Real[r(21)]−Real[r(22)]−Real[r(24)]−Real[r(25)]−Real[r(27)]+Real[r(28)]+Real[r(30)]+sin(pi/3)*−Imag[r(1)]+Imag[r(3)]+Imag[r(4)]−Imag[r(6)]+Imag[r(7)]−Imag[r(9)]+Imag[r(10)]−Imag[r(12)]−Imag[r(19)]+Imag[r(21)]−Imag[r(22)]+Imag[r(24)]+Imag[r(25)]−Imag[r(27)]−Imag[r(28)]+Imag[r(30)]   [Formula 11a]

Imag value: Imag[r(0)]−Imag[r(2)]+Imag[r(5)]+Imag[r(8)]+Imag[r(11)]+Imag[r(13)]−Imag[r(14)]+Imag[r(15)]−Imag[r(16)]+Imag[r(17)]−Imag[r(18)]+Imag[r(20)]+Imag[r(23)]−Imag[r(26)]+Imag[r(29)]+Imag[r(31)]+Imag[r(32)]+Imag[r(33)]+Imag[r(34)]+Imag[r(35)]+cos(pi/3)*−Imag[r(1)]−Imag[r(3)]+Imag[r(4)]+Imag[r(6)]−Imag[r(7)]−Imag[r(9)]−Imag[r(10)]−Imag[r(12)]−Imag[r(19)]−Imag[r(21)]−Imag[r(22)]−Imag[r(24)]−Imag[r(25)]−Imag[r(27)]+Imag[r(28)]+Imag[r(30)]−sin(pi/3)*−Real[r(1)]+Real[r(3)]+Real[r(4)]−Real[r(6)]+Real[r(7)]−Real[r(9)]+Real[r(10)]−Real[r(12)]−Real[r(19)]+Real[r(21)]−Real[r(22)]+Real[r(24)]+Real[r(25)]−Real[r(27)]−Real[r(28)]+Real[r(30)]   [Formula 11b]

Complexity according to Formula 11a and Formula 11b is represented as Formula 12. Comparing Formula 12 to Formula 10, it can be seen that there exists a big difference in complexity.

((52*2)real addition+(2*2)real multiplication)*9600=
(104 real addition+4 real multiplication)*9600   [Formula 12]

Since cos(pi/3)=½, this corresponds to a 1-bit shift in hardware implementation. So, it is insignificant in aspect of an operational quantity. In this case, the operational quantity can be represented as Formula 13.

((51*2)real addition+(1*2)real multiplication)*9600=
(102 real addition+2 real multiplication)*9600   [Formula 13]

Since sin(pi/3)=sqrt(3)/2=0.8660, it is approximated into 0.75 (=½+¼). In this case, since implementation is enabled by a bit shift, if an operational quantity is ignored, complexity is reduced in a manner of Formula 14.

[(51*2)real addition+(1*2)real addition]*9600=(102 real addition)*9600   [Formula 14]

Meanwhile, a sign '+' or '−' is implemented though a code converter in a simple manner and not included in the operational quantity.

In the above-explained example, P-SCH is configured by two repetitions in time domain. Yet, since the specific numerical values are just exemplary to explain the example of the present invention, the present invention is not limited to the specific numerical values.

For instance, Frank sequence with length 16 can be used as an initial sequence. Namely, in the step S1701, Frank sequence with length 16 is generated. In the step S1702, frank sequence with length 16 is repeated four times in time domain. In the step S1703, the sequence is transformed into frequency domain through 64 FFT. In this case, a sequence is inserted at every four frequency indexes. In the step S1704, puncturing is performed on a DC carrier position or a sequence is inserted by avoiding DC carrier. Thereafter, by transforming the sequence into a time-domain signal, it is able to execute the step S1705 if necessary.

INDUSTRIAL APPLICABILITY

Accordingly, the sequence generated by the present invention is able to maintain correlation properties over a predetermined level in time domain and has low PAPR characteristics.

And, the sequence proposed by the present invention is applied to such a communication system as LTE system, thereby configuring a synchronization channel having excellent performance.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of generating a primary synchronization signal in a communication system, the method comprising:
   generating CAZAC (Constant Amplitude Zero Auto-Correlation) sequences with a length of N by repeating CAZAC sequences two or four times within one orthogonal frequency division multiplexing (OFDM) symbol of a time domain;
   performing at least a DFT (Discrete Fourier Transform) operation or an FFT (Fast Fourier Transform) operation for the CAZAC sequences with the length of N;
   performing an IDFT (Inverse Discrete Fourier Transform) operation for the CAZAC sequences on which the DFT is performed or performing an IFFT (Inverse Fast Fourier Transform) operation for the CAZAC sequences on which the FFT is performed;
   circular shifting in a frequency domain the CAZAC sequences on which the IDFT or IFFT is performed;
   generating the primary synchronization signal using the circular shifted CAZAC sequences;
   multiplexing the generated primary synchronization signal with a secondary synchronization signal by a TDM (Time Division Multiplexing) scheme in a specific time duration; and
   transmitting the multiplexed primary synchronization signal,
   wherein CAZAC sequences with a length of 36 in the time domain are repeated twice, and
   wherein values of the CAZAC sequences with the length of 36 include real values and imaginary values and are represented as:

|   | Real | Imaginary |
|---|---|---|
| 0 | 1 | 0 |
| 1 | $-\cos(\pi/3)$ | $-\sin(\pi/3)$ |
| 2 | $-1$ | 0 |
| 3 | $-\cos(\pi/3)$ | $\sin(\pi/3)$ |
| 4 | $\cos(\pi/3)$ | $\sin(\pi/3)$. |

2. The method of claim 1, wherein the CAZAC sequences are Zadoff-Chu sequences.

3. The method of claim 1, wherein:
   wherein the values of the CAZAC sequences with the length of 36 include real values and imaginary values and are represented as:

|   | Real | Imaginary |
|---|---|---|
| 0 | 1 | 0 |
| 1 | $-\cos(\pi/3)$ | $-\sin(\pi/3)$ |
| 2 | $-1$ | 0 |
| 3 | $-\cos(\pi/3)$ | $\sin(\pi/3)$ |
| 4 | $\cos(\pi/3)$ | $\sin(\pi/3)$ |
| 5 | 1 | 0 |
| 6 | $\cos(\pi/3)$ | $-\sin(\pi/3)$ |
| 7 | $-\cos(\pi/3)$ | $\sin(\pi/3)$ |
| 8 | 1 | 0 |
| 9 | $-\cos(\pi/3)$ | $-\sin(\pi/3)$ |
| 10 | $-\cos(\pi/3)$ | $\sin(\pi/3)$ |
| 11 | 1 | 0 |
| 12 | $-\cos(\pi/3)$ | $-\sin(\pi/3)$ |
| 13 | 1 | 0 |
| 14 | $-1$ | 0 |
| 15 | 1 | 0 |
| 16 | $-1$ | 0 |
| 17 | 1 | 0 |
| 18 | $-1$ | 0 |
| 19 | $-\cos(\pi/3)$ | $-\sin(\pi/3)$ |
| 20 | 1 | 0 |
| 21 | $-\cos(\pi/3)$ | $\sin(\pi/3)$ |
| 22 | $-\cos(\pi/3)$ | $-\sin(\pi/3)$ |
| 23 | 1 | 0 |
| 24 | $-\cos(\pi/3)$ | $\sin(\pi/3)$ |
| 25 | $-\cos(\pi/3)$ | $\sin(\pi/3)$ |
| 26 | $-1$ | 0 |
| 27 | $-\cos(\pi/3)$ | $-\sin(\pi/3)$ |
| 28 | $\cos(\pi/3)$ | $-\sin(\pi/3)$ |
| 29 | 1 | 0 |
| 30 | $\cos(\pi/3)$ | $\sin(\pi/3)$ |
| 31 | 1 | 0 |
| 32 | 1 | 0 |
| 33 | 1 | 0 |
| 34 | 1 | 0 |
| 35 | 1 | 0. |

4. An apparatus for generating a primary synchronization signal in a communication system, the apparatus comprising:
   a generating module configured to generate CAZAC (Constant Amplitude Zero Auto-Correlation) sequences with a length of N by repeating CAZAC sequences two or four times within one orthogonal frequency division multiplexing (OFDM) symbol of a time domain;
   at least a DFT module configured to perform a DFT (Discrete Fourier Transform) operation for the CAZAC sequences with the length of N or an FFT module configured to perform an FFT (Fast Fourier Transform) operation for the CAZAC sequences with the length of N;
   at least an IDFT module configured to perform an IDFT (Inverse Discrete Fourier Transform) operation for the CAZAC sequences on which the DFT is performed or an IFFT module configured to perform an IFFT (Inverse Fast Fourier Transform) operation for the CAZAC sequences on which the FFT is performed;
   a circular shifting module configured to circular shift in a frequency domain the CAZAC sequences on which the IDFT or IFFT is performed; and
   a generating module configured to generating the primary synchronization signal using the circular shifted CAZAC sequences; and
   a transmitting module configured to multiplex the generated primary synchronization signal with a secondary synchronization signal by a TDM (Time Division Multiplexing) scheme in a specific time duration and to transmit the multiplexed primary synchronization signal,
   wherein CAZAC sequences with a length of 36 in the time domain are repeated twice, and wherein values of the CAZAC sequences with the length of 36 include real values and imaginary values and are represented as:

| | Real | Imaginary |
|---|---|---|
| 0 | 1 | 0 |
| 1 | $-\cos(\pi/3)$ | $-\sin(\pi/3)$ |
| 2 | $-1$ | 0 |
| 3 | $-\cos(\pi/3)$ | $\sin(\pi/3)$ |
| 4 | $\cos(\pi/3)$ | $\sin(\pi/3)$. |

5. The apparatus of claim 4, wherein the CAZAC sequences are Zadoff-Chu sequences.

6. The apparatus of claim 4, wherein the values of the CAZAC sequence with the length of 36 include real values and imaginary values and are represented as:

| | Real | Imaginary |
|---|---|---|
| 0 | 1 | 0 |
| 1 | $-\cos(\pi/3)$ | $-\sin(\pi/3)$ |
| 2 | $-1$ | 0 |
| 3 | $-\cos(\pi/3)$ | $\sin(\pi/3)$ |
| 4 | $\cos(\pi/3)$ | $\sin(\pi/3)$ |
| 5 | 1 | 0 |
| 6 | $\cos(\pi/3)$ | $-\sin(\pi/3)$ |
| 7 | $-\cos(\pi/3)$ | $\sin(\pi/3)$ |
| 8 | 1 | 0 |
| 9 | $-\cos(\pi/3)$ | $-\sin(\pi/3)$ |
| 10 | $-\cos(\pi/3)$ | $\sin(\pi/3)$ |
| 11 | 1 | 0 |
| 12 | $-\cos(\pi/3)$ | $-\sin(\pi/3)$ |
| 13 | 1 | 0 |
| 14 | $-1$ | 0 |
| 15 | 1 | 0 |
| 16 | $-1$ | 0 |
| 17 | 1 | 0 |
| 18 | $-1$ | 0 |
| 19 | $-\cos(\pi/3)$ | $-\sin(\pi/3)$ |
| 20 | 1 | 0 |
| 21 | $-\cos(\pi/3)$ | $\sin(\pi/3)$ |
| 22 | $-\cos(\pi/3)$ | $-\sin(\pi/3)$ |
| 23 | 1 | 0 |
| 24 | $-\cos(\pi/3)$ | $\sin(\pi/3)$ |
| 25 | $-\cos(\pi/3)$ | $\sin(\pi/3)$ |
| 26 | $-1$ | 0 |
| 27 | $-\cos(\pi/3)$ | $-\sin(\pi/3)$ |
| 28 | $\cos(\pi/3)$ | $-\sin(\pi/3)$ |
| 29 | 1 | 0 |
| 30 | $\cos(\pi/3)$ | $\sin(\pi/3)$ |
| 31 | 1 | 0 |
| 32 | 1 | 0 |
| 33 | 1 | 0 |
| 34 | 1 | 0 |
| 35 | 1 | 0. |

* * * * *